(12) United States Patent
Lin

(10) Patent No.: US 12,363,044 B2
(45) Date of Patent: Jul. 15, 2025

(54) METHOD FOR FACILITATING DATA LINK LAYER INITIALIZATION AND ELECTRONIC DEVICE

(71) Applicant: SK hynix Inc., Icheon-si (KR)

(72) Inventor: Fu Hsiung Lin, Zhubei (TW)

(73) Assignee: SK hynix Inc., Icheon-si (KR)

( * ) Notice: Subject to any disclaimer, the term of this patent is extended or adjusted under 35 U.S.C. 154(b) by 47 days.

(21) Appl. No.: 18/534,235

(22) Filed: Dec. 8, 2023

(65) Prior Publication Data

US 2025/0168121 A1  May 22, 2025

(30) Foreign Application Priority Data

Nov. 20, 2023  (TW) ................................ 112144762

(51) Int. Cl.
*H04L 47/24* (2022.01)
*H04L 43/0823* (2022.01)
*H04L 43/0829* (2022.01)

(52) U.S. Cl.
CPC .......... *H04L 47/24* (2013.01); *H04L 43/0829* (2013.01); *H04L 43/0847* (2013.01)

(58) Field of Classification Search
CPC .. H04L 47/24; H04L 43/0829; H04L 43/0847
See application file for complete search history.

(56) References Cited

U.S. PATENT DOCUMENTS

| | | | |
|---|---|---|---|
| 8,335,958 B2 | 12/2012 | Hamer et al. | |
| 8,402,343 B2 * | 3/2013 | Radulescu | ............ H04L 1/0061 714/758 |
| 9,973,216 B2 | 5/2018 | Radulescu | |
| 11,983,073 B2 * | 5/2024 | Porzio | ................. G06F 11/1417 |
| 12,170,128 B2 * | 12/2024 | Lin | ....................... G11C 7/1063 |
| 2011/0041025 A1 * | 2/2011 | Van Den Hamer | ... H04L 1/0061 714/E11.113 |
| 2023/0377618 A1 * | 11/2023 | Lin | ....................... G11C 7/1066 |
| 2024/0036977 A1 * | 2/2024 | Porzio | ................... G06F 9/4405 |
| 2024/0118974 A1 * | 4/2024 | Lin | ..................... G06F 11/1443 |

FOREIGN PATENT DOCUMENTS

| | | | | |
|---|---|---|---|---|
| KR | 1020210132569 A | | 11/2021 | |
| WO | WO-2012052487 A1 * | | 4/2012 | ........... G06F 1/3234 |

* cited by examiner

*Primary Examiner* — David R Lazaro

(74) *Attorney, Agent, or Firm* — WILLIAM PARK & ASSOCIATES LTD.

(57) ABSTRACT

Method for facilitating data link layer initialization and an electronic device are provided. The method comprises following operations during data link layer initialization in an electronic device. A first acknowledgment and flow control (AFC) frame is transmitted to another electronic device, the first AFC frame including a first indicator to notify the other electronic device that the electronic device does not receive any AFC frame. It is determined that an AFC frame is received within a first time interval after the first AFC frame is transmitted, the first time interval being less than an expiration value of a protection timer. In response to the received AFC frame, a second AFC frame is transmitted to the other electronic device, the second AFC frame including a second indicator to notify the other electronic device that the electronic device receives an AFC frame from the other electronic device.

20 Claims, 15 Drawing Sheets

METHOD FOR FACILITATING DATA LINK LAYER INITIALIZATION AND ELECTRONIC DEVICE

CROSS-REFERENCE TO RELATED APPLICATION

This non-provisional application claims priority under 35 U.S.C. § 119(a) to Taiwanese Patent Application No. 112144762 filed on Nov. 20, 2023, in the Taiwan Intellectual Property Office, the entire contents of which are hereby incorporated by reference.

BACKGROUND OF THE INVENTION

1. Field of the Invention

The present disclosure relates to circuit, controllers, and methods for frame transmission for an electronic device, and in particular to circuits, controllers, and methods for frame transmission for an interconnection protocol, and an electronic device.

2. Description of the Related Art

The Mobile Industry Processor Interface (MIPI) alliance developed interconnection protocol technology, for example, MIPI M-PHY specification associated with a physical layer and MIPI UniPro specification associated with a Unified Protocol (UniPro), for interconnection from one chip to another inside the mobile devices or those affected by the mobile devices in order to implement higher transmission speeds and low power consumption operations. On the other hand, the Joint Electron Device Engineering Council (JEDEC), using the MIPI M-PHY specification and the MIPI UniPro specification, launched a high-performance non-volatile memory standard that is referred to as Universal Flash Storage (UFS). The UFS standard realizes gigabit-level high-speed transmissions and low-power operations, and provides the functionality and expandability required for advanced mobile systems (for example, computing devices such as smartphones, tablet computers, multimedia devices, and wearable devices) to facilitate rapid adoption by the industry.

A system implemented according to the UFS standard or UniPro specification includes a local host (e.g., a computing device or chip) and a remote device (e.g., a storage device or another chip). A bidirectional link is established between the host and the device, and this link in between can be configured with one or multiple lanes in either of the transmission directions. According to the UniPro specification (such as UniPro version 2.0), link-level flow control is used in a data link layer of the protocol stack of the UniPro specification. Data link layer flow control ensures that the transmitting end knows how much buffer space is available at data link layer of the receiving end of the Link. A credit-based flow control mechanism is used whereby the receiving end transmits credit information (in the form of Acknowledgment and Flow Control (AFC) frames) to update credit information maintained at the transmitting end.

According to the UniPro specification (such as UniPro version 2.0), data link layer initialization involves an initial credit exchange, and is the process of preparing the Link to execute its normal operation. During the data link layer initialization, the data link (DL) layer first transmits an AFC frame for traffic class 1 (e.g., denoted by "AFC1") and then transmits an AFC frame for traffic class 0 (e.g., denoted by "AFC0"). Both AFC frames are required to have their respective CReq fields set. As long as the first AFCx frame (e.g., AFC1 or AFC0) has not been received, a protection timer for the respective traffic class (e.g., denoted in UniPro version 2.0 as FCx_PROTECTION_TIMER) runs. For example, according to the UniPro version 2.0 specification, sections 6.6.7, 6.6.9, and 6.6.10, the flow control protection timer behavior, rules for AFC frame transmission, and NAC frame transmission ensure reliable exchange of credits during initialization. When one AFCx frame is received for each traffic class, the initial credit exchange and thus DL Layer initialization are considered complete.

BRIEF SUMMARY OF THE INVENTION

In the present disclosure, technologies for facilitating data link layer initialization for an interconnection protocol are provided, and are suitable for an electronic device capable of communicating with another electronic device according to the interconnection protocol.

Embodiments of a method for facilitating data link layer initialization for an electronic device capable of communicating with another electronic device are provided. The method comprises a plurality of steps (or operations) as follows. a) During data link layer initialization in the electronic device, a first acknowledgment and flow control (AFC) frame for a traffic class is transmitted to the other electronic device, the first AFC frame including a first indicator to notify the other electronic device that the electronic device does not receive any AFC frame for the traffic class from the other electronic device. b) During data link layer initialization in the electronic device, it is determined that an AFC frame for the traffic class is received from the other electronic device within a first time interval after the first AFC frame is transmitted, the first time interval being less than an expiration value of a protection timer. c) During data link layer initialization in the electronic device, in response to the AFC frame for the traffic class received from the other electronic device within the first time interval, a second AFC frame for the traffic class is transmitted to the other electronic device, the second AFC frame including a second indicator to notify the other electronic device that the electronic device receives an AFC frame for the traffic class from the other electronic device.

Embodiments of an electronic device configured to communicate with another electronic device are provided. The electronic device can be implemented as a host device, a storage device, or a chip. The electronic device comprises a controller, which includes a physical layer circuit for signal transmission and a link controller coupled to the physical layer circuit. The controller is configured to perform a plurality of operations during data link layer initialization of the link controller. The plurality of operations includes the following. a) A first acknowledgment and flow control (AFC) frame for a traffic class is transmitted to the other electronic device, the first AFC frame including a first indicator to notify the other electronic device that the electronic device does not receive any AFC frame for the traffic class from the other electronic device. b) It is determined that an AFC frame for the traffic class is received from the other electronic device within a first time interval after the first AFC frame is transmitted, the first time interval being less than an expiration value of a protection timer. c) In response to the AFC frame for the traffic class received from the other electronic device within the first time interval, a second AFC frame for the traffic class is transmitted to the other electronic device, the second AFC frame including a second indicator to notify the other electronic device that the electronic device receives an AFC frame for the traffic class from the other electronic device.

In some embodiments of the method or the electronic device, in the operation a), the first AFC frame is transmitted for a number of times in response to not receiving any AFC frame for the traffic class from the other electronic device before the protection timer expires.

In some embodiments of the method or the electronic device, the plurality of operations further includes determining that the AFC frame for the traffic class received from the other electronic device includes a corresponding second indicator to notify the electronic device that the other electronic device receives an AFC frame for the traffic class from the electronic device, wherein the data link layer initialization for the traffic class in the electronic device is completed.

In some embodiments of the method or the electronic device, the plurality of operations further includes determining that the AFC frame for the traffic class received from the other electronic device includes a corresponding first indicator to notify the electronic device that the other electronic device does not receive an AFC frame for the traffic class from the electronic device; and in response to the AFC frame for the traffic class received from the other electronic device includes the corresponding first indicator, re-transmitting the second AFC frame for the traffic class to the other electronic device, the second AFC frame including the second indicator to notify the other electronic device that the electronic device receives an AFC frame for the traffic class from the other electronic device.

In some embodiments of the method or the electronic device, a lane alignment pattern is transmitted before re-transmitting the second AFC frame.

In some embodiments of the method or the electronic device, the plurality of operations further includes determining that the AFC frame for the traffic class received from the other electronic device includes the corresponding first indicator to notify the electronic device that the other electronic device does not receive an AFC frame for the traffic class from the electronic device and determining that number of re-transmitting of the second AFC frame for the traffic class to the other electronic device reaches a retry number threshold; and transmitting an error message indicating an error of data link layer initialization for the traffic class to notify an application layer of the electronic device before the protection timer expires.

In some embodiments of the method or the electronic device, the first AFC frame is based on an AFC frame of a Unified Protocol and the first AFC frame uses at least one reserved bit in the AFC frame of the Unified Protocol as the first indicator to notify the other electronic device that the electronic device does not receive any AFC frame for the traffic class from the other electronic device.

In some embodiments of the method or the electronic device, the second AFC frame is based on an AFC frame of a Unified Protocol and the second AFC frame uses at least one reserved bit in the AFC frame of the Unified Protocol as the second indicator to notify the other electronic device that the electronic device receives an AFC frame for the traffic class from the other electronic device.

In some embodiments of the method or the electronic device, the first AFC frame is based on an AFC frame of a Unified Protocol (UniPro) and the first AFC frame uses at least one field for indicating a credit transmit request in the AFC frame of the Unified Protocol (UniPro) as the first indicator to notify the other electronic device that the electronic device does not receive any AFC frame for the traffic class from the other electronic device.

In some embodiments of the method or the electronic device, the second AFC frame is based on an AFC frame of a Unified Protocol and the second AFC frame uses at least one field for indicating a credit transmit request in the AFC frame of the Unified Protocol as the second indicator to notify the other electronic device that the electronic device receives an AFC frame for the traffic class from the other electronic device.

Accordingly, the above embodiments can facilitate error recovery of data link layer initialization.

DETAILED DESCRIPTION OF THE INVENTION

To facilitate understanding of the object, characteristics and effects of this present disclosure, embodiments together with the attached drawings for the detailed description of the present disclosure are provided.

Regarding data link layer initialization, the inventor observes that current data link layer initialization completion condition has a blind spot. According to data link layer initialization specified in UniPro version 2.0, either side of two devices can transmit an AFCx frame with CReq=1 for each traffic class to a peer side and "when one AFCx frame is received for each traffic class, the initial credit exchange and thus DL Layer initialization are considered complete." However, the transmitting side does not know whether the "transmitted AFCx frames with CReq=1" are correctly received by the peer side. For example, the transmitted AFCx frames may not be correctly received by the peer side due to Serializer/Deserializer (SerDes) channel's problem, peer side receiver's problem, and so on. In other words, the data link layer initialization completion condition is based on received AFCx frames, it ignores the situations—whether the transmitted AFCx frame is correctly received by the peer side or not.

Figure 1:
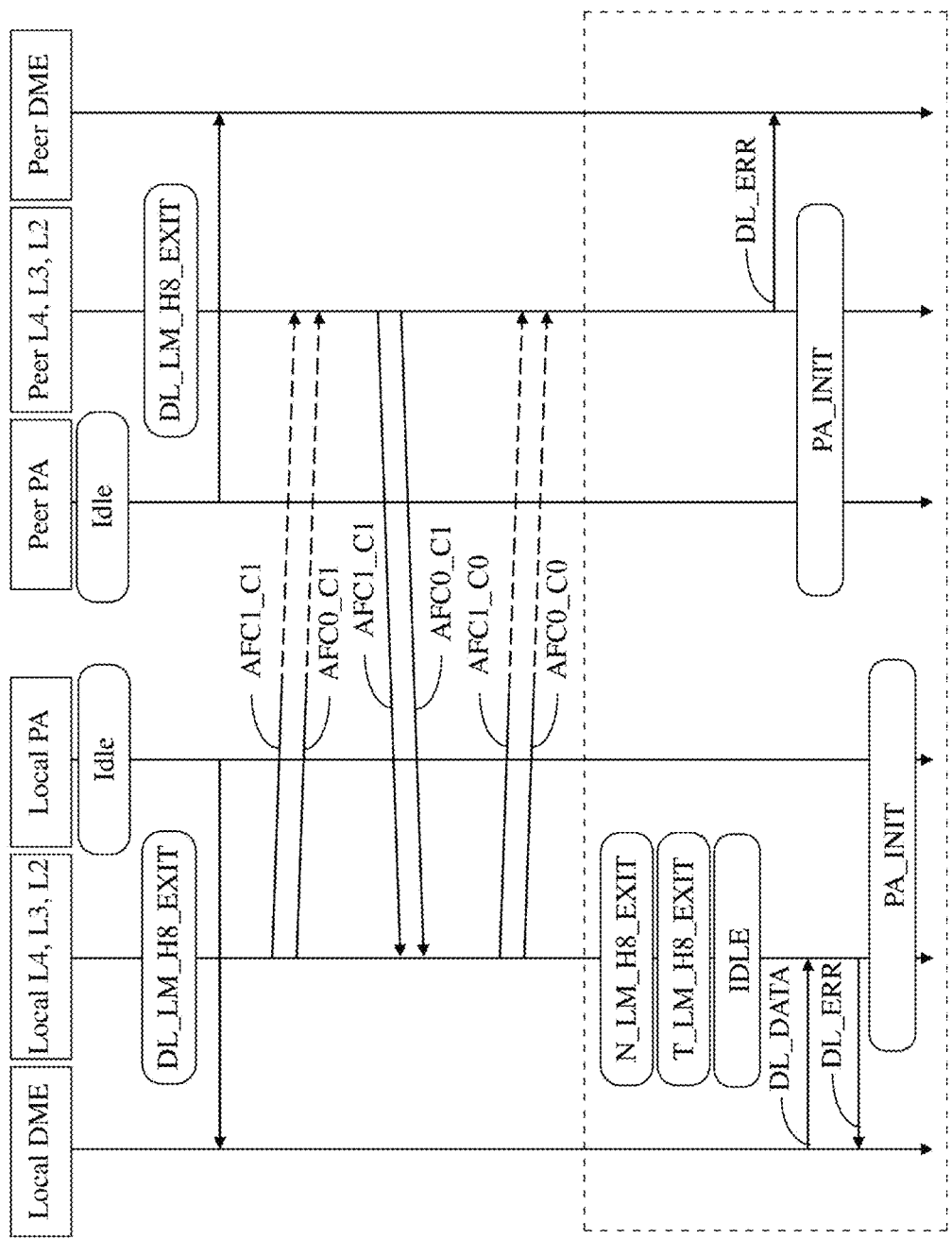
FIG. 1 is a diagram illustrating an example of error recovery of data link layer initialization in which errors occurs.

In this regard, FIG. 1 illustrates an example of conventional error recovery of data link layer initialization with errors. Referring to FIG. 1, a local device and a remote device are performing DL layer initialization according to UniPro version 2.0 specification, wherein the receiving path of the remote device has transmission problems. In FIG. 1, the local device is represented by its UniPro stack including a transport layer, a network layer, a data link layer (denoted by "Local L4, L3, L2"), a physical adapter layer (denoted by "Local PA"), and a device management entity (DME) (denoted by "Local DME"). Likewise, the remote device is represented by its UniPro stack, denoted by "Peer PA", "Peer L4, L3, L2", and "Peer DME". In FIG. 1, in response to requests from respective DME to exit a hibernate state, the local device and the remote device change their state from an idle state to another state and a hibernate exit procedure for DL layer (denoted by DL_LM_H8_EXIT) begins.

For the hibernate exit procedure for DL layer, as shown in FIG. 1, firstly, on the local side, an AFCx frame with CReq=1 for each traffic class is transmitted, wherein x equals 1 for traffic class 1 (TC1) or x equals 0 for traffic class 0 (TC0). For the sake of brevity, an AFC1 frame with CReq=1 for TC1 is denoted by AFC_C1; and an AFC0 frame with CReq=1 for TC0 is denoted by AFC0_C1. As shown in FIG. 1, the arrows with dashed portions indicate that the AFCx frame denoted by AFC_C1 or AFC0_C1 is not successfully received by the remote device (or called peer side). On the other hand, the peer side transmits its AFCx frame with CReq=1 for each traffic class (denoted by AFC1_C1 and AFC0_C1) to the local side. On the local side, the AFCx frames with CReq=1 from the peer side are correctly received and thus the local side treats DL layer initialization completed successfully and completes the hibernate exit procedure for the DL layer. After that, the hibernate exit procedure for the network layer (denoted by N_LM_H8_EXIT) and hibernate exit procedure for the transport layer (denoted by T_LM_H8_EXIT) are done and the local side's upper layer starts to transmit data frames as indicated by a request, denoted by DL_DATA, for transmitting data for the DL layer.

Unfortunately, on the peer side. AFCx frame with CReq=1 (denoted by AFC1_C1 and AFC0_C1) and AFCx frame with CReq=0 (denoted by AFC1_C0 and AFC0_C0) are still not correctly received due to the receiving path of the remote device with transmission problems at that time. Hence, a protection timer expires on the peer side and the peer side starts to do physical adapter (PA) layer initialization (denoted by PA_INIT). On the other hand, the local side's replay timer also expires and starts to do PA layer initialization (denoted by PA_INIT). In addition, both the local side and peer side have to report the error of timer expiration to respective DME, as denoted by DL_ERR.

This example as shown in FIG. 1 demonstrates an error recovery mechanism according to UniPro specification (e.g., UniPro version 2.0) in a worse case. In the worst case as shown in FIG. 1, the error recovery mechanism may operate inefficiently. Specifically, the local side has completed hibernate exit procedure and a data frame has been transmitted for a long time; the local side's replay timer expires and it starts to do PA layer initialization. On the other hand, the peer side waits for protection timer and re-does PA layer initialization at the same time. In addition, the expiration time for the protection timer and replay timer is in millisecond (ms) scale. Hence, when it comes to the worse case, the operations according to the error recovery mechanism may take a long time, which may in millisecond scale, due to the protection timer expiration, and cause the local and peer sides to enter different states (e.g., different protocol states such as UniPro states), but the DL layer initialization fails eventually.

The above issue of the error recovery mechanism for DL layer initialization may occur in a link startup procedure or hibernate exit procedure. In particular, the hibernate exit procedure has power-off and power-on switching operations when a device exiting from a hibernate state and involves DL layer initialization. Each vendor's physical layer (e.g., M-PHY) implementation may have some internal startup actions before receiving AFCx frames to complete DL layer initialization, especially for different behavior between each transmitter and receiver of the physical layer (e.g., M-PHY). When a receiver on the local or remote side misses the incoming AFCx frames in the beginning stage, the AFCx frames cannot be detected correctly and DL layer initialization would fail, as shown in FIG. 1.

Accordingly, in the present disclosure, technologies for facilitating data link layer initialization are provided, and are suitable for an electronic device capable of communicating with another electronic device according to an interconnection protocol. Embodiments of a method for facilitating data link layer initialization are provided, facilitating flow control information exchange completed robustly. By using the method, error recovery of data link layer initialization can be performed effectively and more efficiently. A "robust" error recovery of DL layer initialization on the hibernate exit procedure can be achieved to avoid asynchronous states between the local and peer sides when the peer side's receiver misses the AFCx frame at the beginning stage of DL layer initialization. In some embodiments, error recovery of DL layer initialization can be speeded up.

Figure 2:
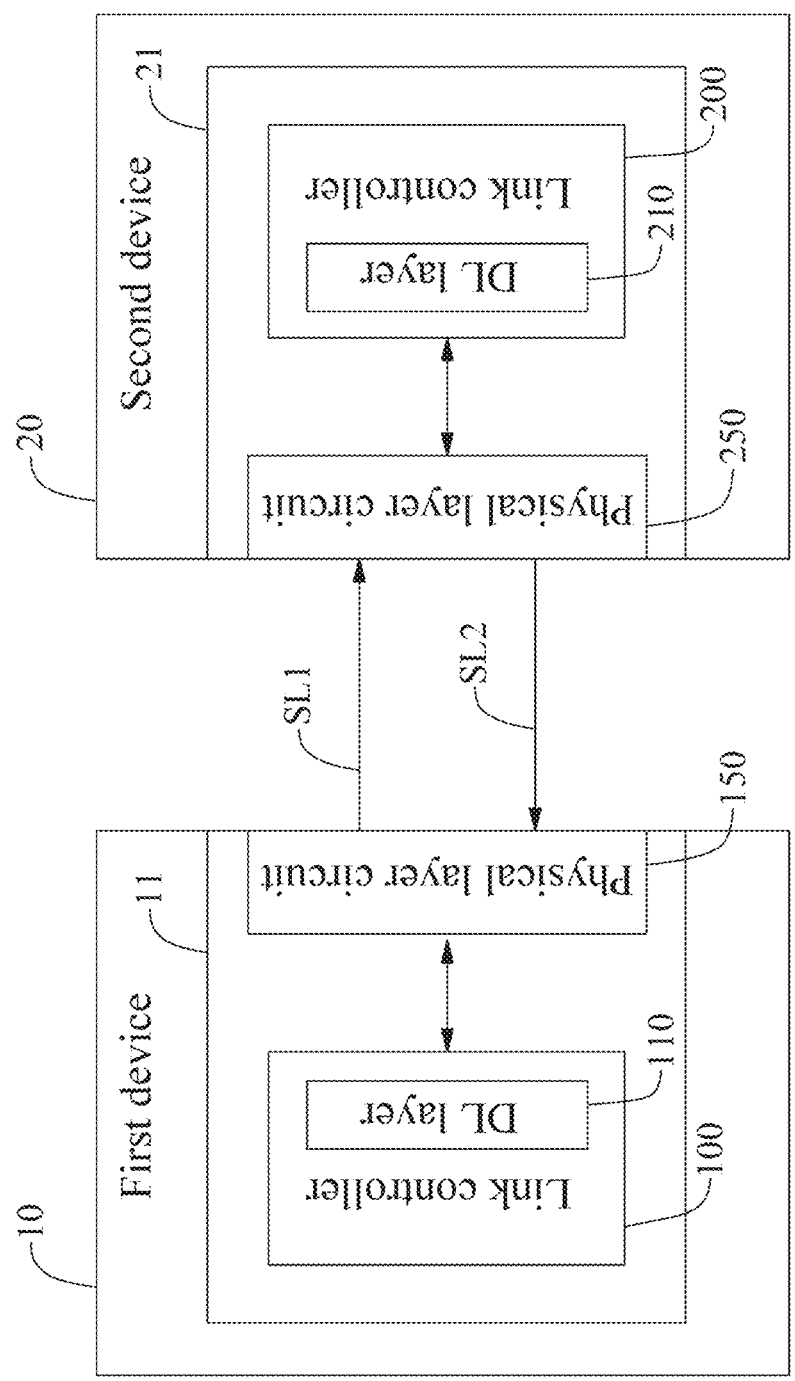
FIG. 2 is a diagram illustrating an embodiment of a communication system capable of communication according to an interconnection protocol.

FIG. 2 illustrates an embodiment of a communication system capable of communication according to an interconnection protocol. The interconnection protocol may be based on a modified UniPro specification, a modified UFS system, or other related communication protocols or specifications, and so on, whenever appropriate. The communication system, for example, includes a first device 10 and a second device 20, which can be a local host and a remote device respectively, or vice versa. In FIG. 2, the first device 10 includes a link controller 100 and a physical layer circuit 150, which may be implemented as a controller 11. Likewise, the second device 20 includes a link controller 200 and a physical layer circuit 250, which may be implemented as a controller 21. The link controller 100 of the first device 10 for example implements a protocol layer (or "link layer." with respect to the physical layer such as M-PHY) such as a modified UniPro layer including a data link (DL) layer 110; and likewise, the link controller 200 of the second device 20 for example also implements the protocol layer (or "link layer") such as a modified UniPro layer including a data link (DL) layer 210. The first device 10 is capable of communicating with the second device 20 via a link including at least one data lane SL1 and at least one data lane SL2, which are bidirectional, according to the interconnect protocol. For example, the interconnection protocol is applicable to a wide range of device types (e.g., for first device or second device) such as application processors, co-processors, modems, storage subsystems including non-volatile memory modules, displays, camera sensors, 3D graphics and multimedia accelerators, chips, and so on. It is also applicable to different types of data traffic such as control messages, bulk data transfer and packetized streaming. Other related MIPI alliance specifications or other related specifications can also be used for implementation of the physical layer or application layer, whenever appropriate.

Various embodiments for error recovery during data link layer initialization for the interconnection protocol are provided below to facilitate data link layer initialization, such as making data link layer initialization completed robustly or speeding up error recovery.

Figure 3:
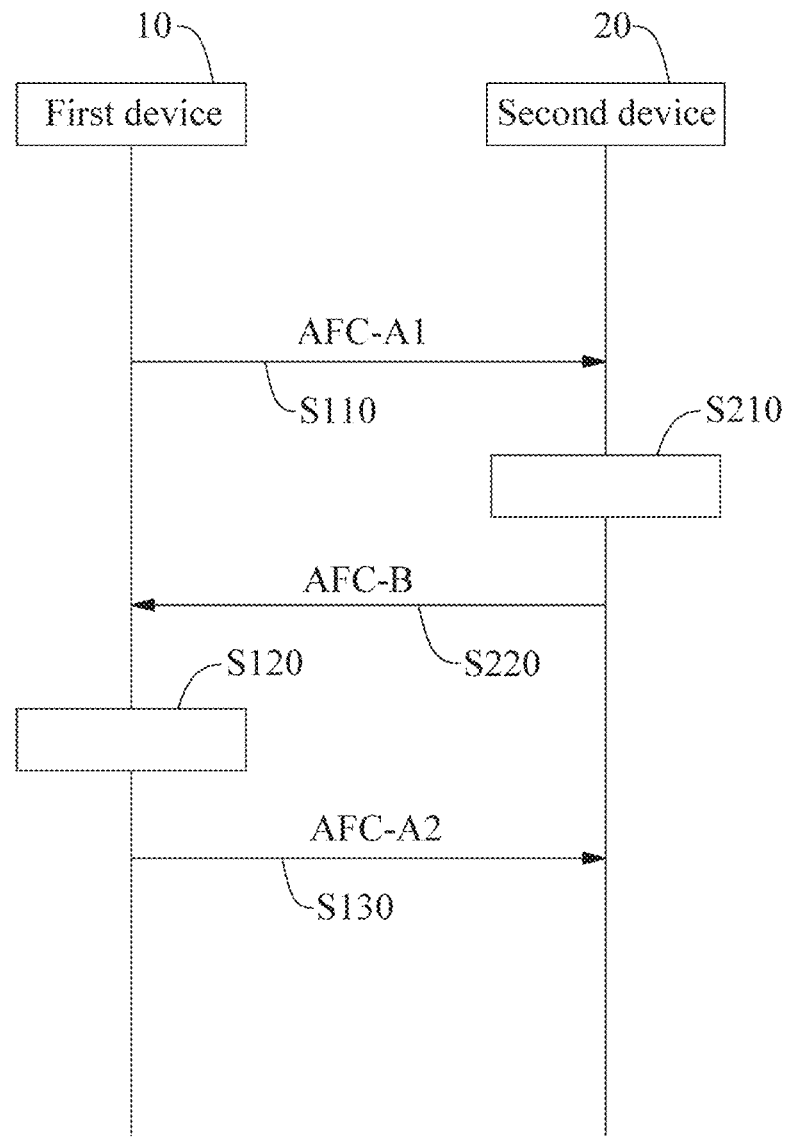
FIG. 3 is a diagram illustrating an embodiment of an operation flow of facilitating data link layer initialization.

FIG. 3 illustrates an embodiment of an operation flow of facilitating data link layer initialization. In FIG. 3, the operations are performed during data link layer initialization. For the sake of illustration, data link layer initialization is illustrated for a traffic class (e.g., TC1 or TC0). Certainly, the operation flow or related embodiments can be applied to another traffic class or each traffic class whenever appropriate.

In operation S110, by the first device 10, a first acknowledgment and flow control (AFC) frame (e.g., denoted by AFC-A1) for a traffic class is transmitted to the second device 20, wherein the first AFC frame includes a first indicator to notify the second device 20 that the first device 10 does not receive any AFC frame for the traffic class from the second device 20.

In operation S210, by the second device 20, it is determined that an AFC frame (e.g., AFC-A1) for a traffic class is received from the first device 10.

In operation S220, in response to the AFC frame (e.g., AFC-A1) for the traffic class received from the first device 10, an AFC frame (e.g., denoted by AFC-B) is transmitted to the first device 10. For example, the AFC frame (e.g., AFC-B) for the traffic class can include a second indicator to notify the first device 10 that the second device 20 receives an AFC frame for the traffic class from the first device 10.

In operation S120, by the first device 10, it is determined that an AFC frame (e.g., AFC-B) for the traffic class is received from the second device 20 within a first time interval after the first AFC frame (e.g., AFC-A1) is transmitted, wherein the first time interval is less than an expiration value of a protection timer for the traffic class. For example, the protection timer for the traffic class can be started when the first AFC frame for the traffic class is transmitted or when the DL layer initialization is entered.

In operation S130, in response to the AFC frame (e.g., AFC-B) for the traffic class received from the second device 20 within the first time interval, a second AFC frame (e.g., denoted by AFC-A2) for the traffic class is transmitted to the second device 20, wherein the second AFC frame (e.g., denoted by AFC-A2) includes a second indicator to notify the second device 20 that the first device 10 receives an AFC frame for the traffic class from the second device 20.

Figure 4A:
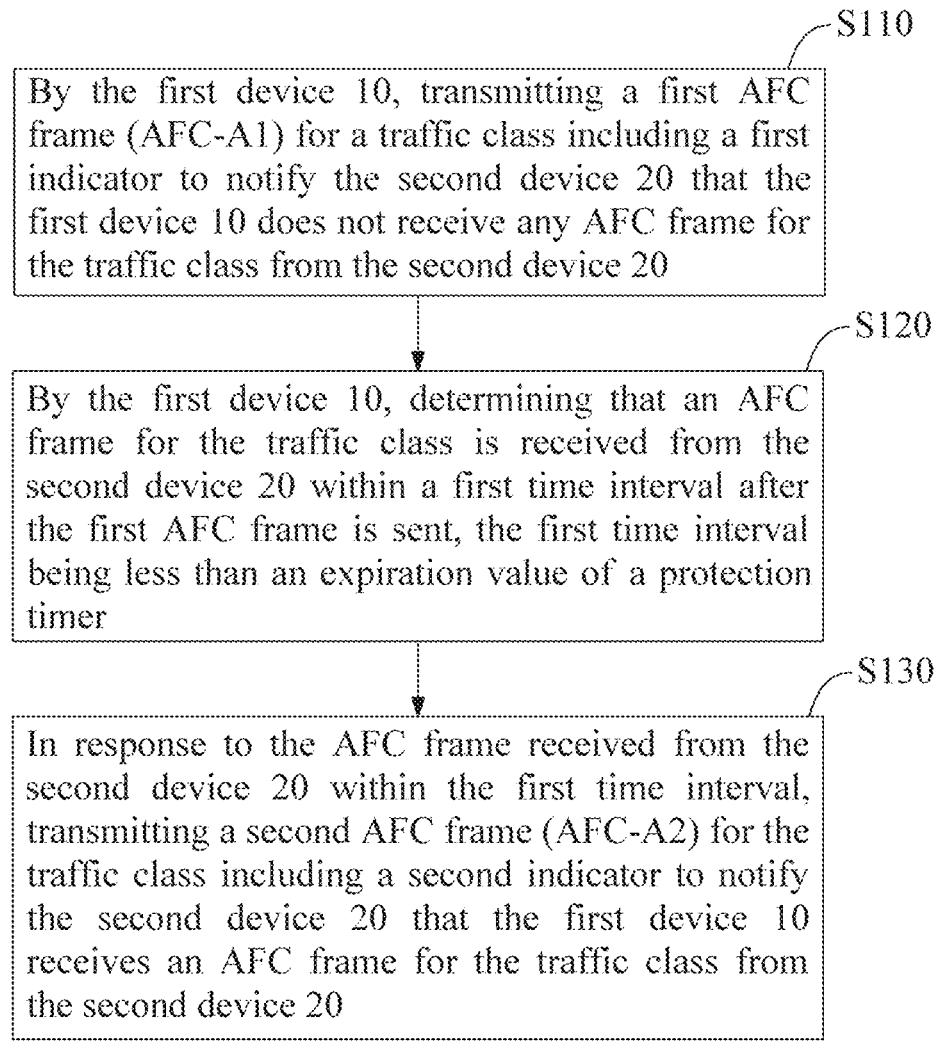
FIG. 4A is a flowchart illustrating an embodiment of a method for facilitating data link layer initialization with respect to a first device according to FIG. 3.

FIG. 4A is a flowchart illustrating an embodiment of a method for facilitating data link layer initialization with respect to a first device according to FIG. 3. The method of FIG. 4A includes the operations S110, S120, and S130 and is provided for the first device 10 to facilitate data link layer initialization for a traffic class (e.g., TC1 or TC0).

The operation flow according to FIG. 3 or FIG. 4A can further include one or more operations to facilitate data link layer initialization. Some embodiments are provided below with respect to the first device 10. Certainly, the method or related embodiments can be applied to another traffic class or each traffic class whenever appropriate.

In some embodiments of the operation flow according to FIG. 3 or FIG. 4A, in the operation S110, the first AFC frame (e.g., AFC-A1) for the traffic class can be transmitted for a number of times in response to not receiving any AFC frame from the second device 20 before the protection timer expires. For example, the second device 20 may not receive the first AFC frame (e.g., AFC-A1) for the traffic class due to errors in the receiving path of the second device 20; or the second device 20 may not transmit an AFC frame for the traffic class to the first device 10 successfully due to errors in the transmitting path of the second device 20.

In some embodiments of the operation flow according to FIG. 3 or FIG. 4A, the operation flow further includes determining that the AFC frame (e.g., AFC-B) for the traffic class received from the second device 20 includes a corresponding second indicator to notify the first device 10 that the second device 20 receives an AFC frame (e.g., AFC-A1) for the traffic class from the first device 10, wherein the data link layer initialization for the traffic class is completed in the first device 10. In this manner, the data link layer initialization can be completed robustly.

In some embodiments of the operation flow according to FIG. 3 or FIG. 4A, the operation flow further includes determining that the AFC frame (e.g., AFC-B) for the traffic class received from the second device 20 includes a corresponding first indicator to notify the first device 10 that the second device 20 does not receive an AFC frame for the traffic class from the first device 10; and in response to that the AFC frame (e.g., AFC-B) received from the second device 20 includes the corresponding first indicator, re-transmitting the second AFC frame (e.g., AFC-A2) for the traffic class to the second device 20, the second AFC frame (e.g., AFC-A2) including the second indicator to notify the second device 20 that the first device 10 receives an AFC frame (e.g., AFC-B) for the traffic class from the second device 20.

In some embodiments of the operation flow according to FIG. 3 or FIG. 4A, a lane alignment pattern is transmitted before re-transmitting the second AFC frame (e.g., AFC-A2). In this manner, the transmitting of the second AFC frame can be more reliable. For example, the lane alignment pattern can a de-skew pattern according to the UniPro specification or any other lane alignment pattern, whenever appropriate.

In some embodiments of the operation flow according to FIG. 3 or FIG. 4A, the operation flow further includes determining that the AFC frame (e.g., AFC-B) for the traffic class received from the second device 20 includes the corresponding first indicator to notify the first device 10 that the second device 20 does not receive an AFC frame for the traffic class from the first device 10 and determining that number of re-transmitting of the second AFC frame for the traffic class to the second device 20 reaches a retry number threshold (or referred to as a retry number limit); and transmitting an error message indicating an error of data link layer initialization for the traffic class to notify an application layer of the first device 10 before the protection timer expires. For example, in a situation, the second device 20 cannot receive the first AFC frame (e.g., AFC-A1) for the traffic class due to failure in the receiving path of the second device 20, but the second device 20 can transmit an AFC frame for the traffic class to the first device 10 successfully. In this situation, after a specific number (e.g., 1, 2, or so on) of retries, the first device 10 can transmit an error message to the application layer before the protection timer expires. In this manner, the error recovery can be speeded up.

Figure 4B:
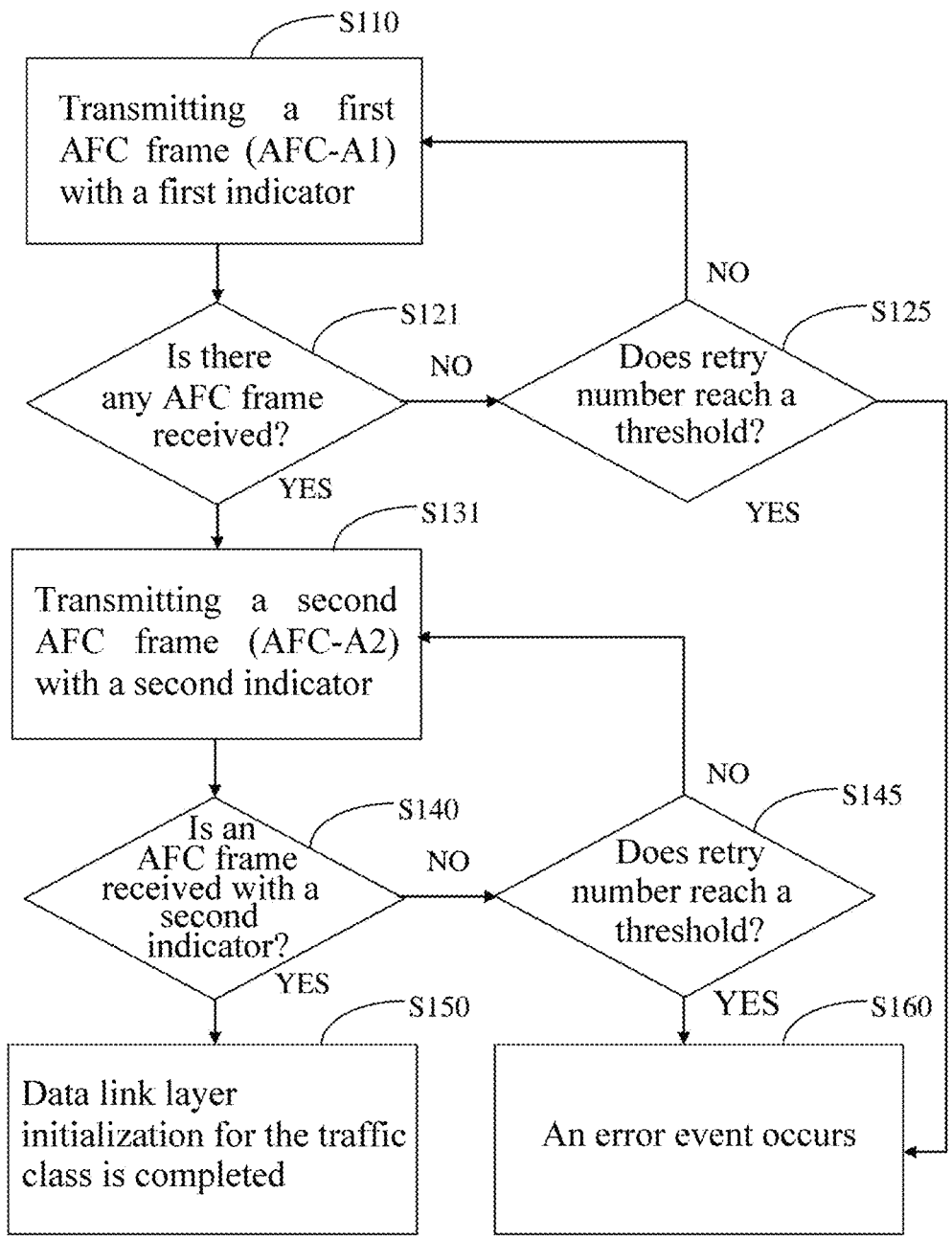
FIG. 4B is a flowchart illustrating another embodiment of a method for facilitating data link layer initialization with respect to a first device.

FIG. 4B illustrates another embodiment of a method for facilitating data link layer initialization with respect to a first device for a traffic class, which can be applied to another traffic class or each traffic class whenever appropriate.

In operation S110, it is to transmit a first AFC frame (e.g., AFC-A1) with a first indicator to notify the second device 20 that the first device 10 does not receive any AFC frame for the traffic class from the second device 20 for the traffic class. A protection timer starts when the first AFC frame is transmitted.

In operation S121, it is determined whether there is any AFC frame for the traffic class received by the first device 10 within a first time interval after the first AFC frame (e.g., AFC-A1) for the traffic class is transmitted, wherein the first time interval is less than an expiration value of the protection timer. If there is an AFC frame received, operation S131 is performed. Otherwise, if there is still no AFC frame for the traffic class received by the first device 10 within the first time interval after the first AFC frame (e.g., AFC-A1) is transmitted, operation S125 is performed. For example, a first retry timer for the traffic class with an expiration value of the first time interval can be started when the first AFC frame for the traffic class is transmitted, and if the first retry timer for the traffic class expires, operation S125 is performed.

In operation S125, it is determined whether a retry number, e.g., number of re-transmitting an AFC frame for the traffic class with a first indicator, reaches a threshold, which may be referred to a retry number limit, such as 1 or 2. If the retry number for the traffic class does not reach the threshold, the operation S110 can be performed again. If the retry number for the traffic class reaches the threshold, operation S160 is performed.

In operation S131, it is to transmit a second AFC frame (AFC-A2) for the traffic class with a second indicator to notify the second device 20 that the first device 10 receives an AFC frame for the traffic class from the second device 20.

In operation S140, it is determined whether an AFC frame for the traffic class is received with a corresponding second indicator to notify the first device 10 that the second device 20 receives an AFC frame (e.g., AFC-A1) for the traffic class from the first device 10. If an AFC frame for the traffic class is received with such a second indicator, operation S150 is performed. The AFC frame with the second indicator may be received either within a second time interval after the second AFC frame (e.g., AFC-A2) for the traffic class is transmitted or before the second AFC frame is transmitted, wherein the second time interval is less than the expiration value of the protection timer. If no AFC frame is received with the second indicator, operation S145 is performed.

In operation S145, it is determined whether a retry number (e.g., number of re-transmitting an AFC frame for the traffic class with a second indicator) reaches a threshold, which may be referred to as a retry number limit, such as 1 or 2. If the retry number for the traffic class does not reach the threshold, the operation S131 can be performed again. If the retry number for the traffic class reaches the threshold, operation S160 is performed.

In operation S150, it indicates that data link layer initialization for the traffic class is completed.

In operation S160, it indicates that an error event occurs in data link layer initialization for the traffic class. For example, the data link layer of the first device 10 can transmit a message indicating such an error event to the DME of the first device 10.

In some embodiments of the method or the first device 10, the first AFC frame is based on an AFC frame of a Unified Protocol (UniPro)(e.g., UniPro version 2.0 and so on) and the first AFC frame uses at least one field for indicating a credit transmit request (e.g., a CReq bit indicated by CR in FIG. 5) in the AFC frame of the UniPro as the first indicator to notify the second device 20 that the first device 10 does not receive any AFC frame for the traffic class from the second device 20.

In some embodiments of the method or the first device 10, the second AFC frame is based on an AFC frame of the Unified Protocol (UniPro) and the second AFC frame uses at least one field for indicating a credit transmit request (e.g., a CReq bit indicated by CR in FIG. 5) in the AFC frame of the UniPro as the second indicator to notify the second device 20 that the first device 10 receives an AFC frame for the traffic class from the second device 10.

In some embodiments of the method or the first device 10, the first or second AFC frame is based on an AFC frame of a Unified Protocol (UniPro)(e.g., UniPro version 2.0 and so on). In addition, a new control data field can be added in the AFC frame as the first indicator or the second indicator, for example, in a modified UniPro specification or a future version of UniPro specification. Alternatively, at least one reserved bit in the AFC frame of the Unified Protocol (UniPro) can be used as the first or second indicator.

Various embodiments are provided below for facilitating data link layer initialization, and are suitable for an electronic device capable of communicating with another electronic device according to the interconnection protocol. The interconnection protocol can be derived from the UFS standard or UniPro specification. For example, a conventional UFS system includes a UFS host and a UFS device. The UFS host and the UFS device communicate each other through respective UFS Interconnect (UIC) layer including UniPro and M-PHY. Accordingly, the interconnection protocol can be implemented and derived from architecture of the conventional UFS system by using a modified UFS system implementing a modified version of UniPro and a modified version of M-PHY for providing new high-speed modes or using an advanced signaling scheme.

In the following embodiments, the UniPro specification such as UniPro version 2.0 is taken as examples. Certainly, the implementation of the disclosure is not limited thereto.

In some embodiments, an enhanced frame error recovery scheme (or referred to as robust mode), an indication field for facilitating control information to be exchanged completely (or referred to as ECPL field) and a new retry timer for transmitting AFC frames whose expiration time is shorter than that of a protection timer can be implemented for DL layer initialization in an interconnection protocol. This is to make both sides of the communication system with a local host and a remote device capable of truly exchanging initial control information (such as credit values, and so on) completely via AFCx frames. In a worse case, if retry number of re-transmitting an AFC frame for a traffic class at one side of the local host and remote device is above or equal to a retry number limit (such as a retry number limit denoted by DL_FCxRetryNumLimit), an error indication (such as a primitive parameter, denoted by DL_INIT_ERROR, indicating an error event in the DL layer initialization) can be issued to DME Layer to notify an application layer so that error recovery can be performed earlier than the expiration time of the protection timer while the protection timer is still on operation at this time.

For example, to provide robust frame error recovery of DL layer initialization, a new indication field in an AFC frame can be implemented to indicate whether a credit value is truly Exchanged ComPLetely (ECPL), wherein the indication field can be referred to as an "ECPL" field. This ECPL field can be used to represent that a local side has transmitted AFCx frame with CReq=1 and the local side has also received any AFCx frame, and thus the local side can transmit AFCx frame with ECPL=1'b1 to a peer side to notify that its initial credit has been truly Exchanged ComPLetely. CReq indicates a credit transmit request for requesting flow control information for the traffic class from the peer, for example, as specified in a UniPro specification (such as UniPro version 2.0). The AFC frame with an ECPL field equal to a first value such as '0' can be regarded as an embodiment of an AFC frame including a first indicator as described in a method according to FIG. 3, FIG. 4A. FIG. 4B, or related embodiments. The AFC frame with an ECPL field equal to a second value such as '1' can be regarded as an embodiment of an AFC frame including a second indicator as described in a method according to FIG. 3, FIG. 4A, FIG. 4B, or related embodiments.

Following the above example, if a local side (or a remote side) still does not yet receive any AFCx frame with ECPL=1'b1, the local side (or the remote side) re-transmits AFCx frame with ECPL=1'b1 after a retry timer expires to notify the peer side that initial credit exchange has been completed on the local side (or the remote side). The DL layer initialization of the local side (or the remote side) is not completed until the local side (or the remote side) receives AFCx frame with ECPL=1'b1 from the peer side or retry number is above or equal to a retry number limit (e.g., a retry number limit denoted by DL_FCxRetryNumLimit).

Based on these embodiments of the enhanced or robust frame error recovery of DL layer initialization, advantages can be achieved as below. Firstly, it is more robust to truly exchange initial control information such as credit values with more AFCx frames before the protection timer expires when UniPro state changes from a hibernate state to a link-up state (e.g., a state ready to transmit and receive data). The ECPL field or other equivalent approach can be employed to avoid asynchronous states between the local side and peer side (e.g., the situation in FIG. 1) and the retry timer can be used to make more control information exchange opportunity. In addition, the enhanced or robust frame error recovery can be speeded up in earlier stage than the conventional error recovery which is performed only when the protection timer or replay timer expires, particularly when the power mode of the communication system according to the interconnection protocol is at a high-speed mode of the physical layer (e.g., based on M-PHY specification). For example, based on M-PHY specification version 5.0 or so on, a high-speed mode (HS-MODE) is capable of transmission at gigabit-per-second-level rates, such as a high-speed gear 5A/B (HSG5A/B) or above, and a data rate of the high-speed mode is higher and a corresponding unit interval or symbol interval is very short such as in a scale of nanosecond (ns)). As compared to the unit interval or symbol interval which may be in a scale of nanosecond (ns) in such a higher-speed mode, the expiration time of the protection timer in a scale of millisecond (ms) is a long interval which may make a longer latency. In addition, when the peer side's application layer (e.g., firmware) receives an error indication earlier, device firmware can determine how to fine tune parameters of the link layer (e.g., UniPro) and physical layer (e.g., M-PHY) to become robust. The enhanced frame error recovery scheme can also avoid spending much time on, for example, undesired operations which may result from the worst case illustrated by FIG. 1, such as waiting for protection timer expiration, line reset operation, device reset, unwanted behavior of local side and so on.

Further, in some embodiments of the enhanced or robust frame error recovery of DL layer initialization, the local host or remote device can transmit a lane alignment pattern before an AFC frame is re-transmitted (or referred to as re-sent). For example, optionally, a data link layer transmitter (DL TX) can transmit a signal to notify PA layer to transmit PA_LANE_ALIGN, as specified in the UniPro specification, when DL TX is required to re-transmit an AFCx frame after the retry timer expires. The AFCx frame can be re-transmitted in an existing burst or in a new burst, for example.

Figure 5:
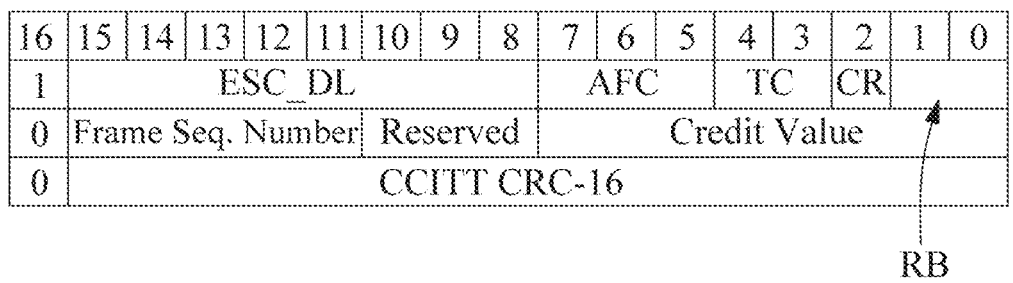
FIG. 5 is a diagram illustrating an example of an AFC frame for data link layer initialization.

Referring to FIG. 5, an example of an AFC frame for data link layer initialization is shown. The data link layer Acknowledgment and Flow Control (AFC) frame is used for acknowledging correctly received data frames and for exchanging flow control information of the corresponding traffic class. The AFC frame starts with an AFC control symbol (e.g., the first symbol with an escaped data type "ESC_DL"), which is followed by two data symbols. The AFC frame includes the traffic class (TC) identification, credit transmit request (CReq) bit (e.g., indicated by CR in FIG. 5), frame sequence number, and flow control credit value. The acknowledgment (frame sequence number) and flow control (credit value) information are assigned to the traffic class identified by the TC field. As shown in FIG. 5, there are two reserved bits, indicated by RB, in the AFC frame of the Unified Protocol (UniPro) and at least one or both of the reserved bits can be used as the ECPL field, which can be regarded as embodiments of the first and second indicators as described in a method according to FIG. 3, FIG. 4A, FIG. 4B, or related embodiments. For example, bit 0 of control symbol (or bit 0 of the parameter field of the control symbol) as shown in FIG. 5 can be adopted as the ECPL field. From UniPro version 2.0 specification, the reserved bits of the parameter field (e.g., bits 0 to bits 4 of the control symbol) are ignored at the receiver. Accordingly, the use of at least one of the reserved bits of the parameter field as the ECPL field is feasible for a first device and a second device supporting the ECPL field. Even in a case that a device not supporting the ECPL field receives an AFC frame with the ECPL field from a device supporting the ECPL field, the device not supporting the ECPL field will not be affected since it will ignore the ECPL field of the AFC frame according to UniPro version 2.0 specification. In another example, bit 1 of the control symbol can also be taken as an ECPL field. In other examples, both bit 0 and bit 1 can also be taken as an ECPL field. Certainly, the implementation of the present disclosure is not limited to these examples. Further, in contrast to the reserved bits of the parameter field of a DL layer control symbol, a reserved value (which can be regarded as reserved bit(s)) of the traffic class identification field (or referred to as a control symbol type field, indicated by bits 5 to bits 7 of the control symbol)

of the DL layer control symbol cannot be used by a transmitted and a control symbol with a reserved value, even being received, will be dropped by the receiver, according to UniPro version 2.0 specification.

TABLE 1 shows examples of description and related values of attributes for some embodiments of the enhanced frame error recovery scheme, such as DL_FCxRetryTimeOutVal, DL_FCxRetryNumLimit, and DL_FCx_ECPL_En.

For example, ECPL field and FCx_RETRY_TIMER are disabled when DL_FCxRetryTimeOutVal is zero, in the DL layer initialization phase or after DL layer initialization phase is completed.

For example, FCx_RETRY_TIMER is reset when at least one of the following conditions is valid: the expiration of FCx_RETRY_TIMER and the reception of an error-free AFCx frame.

TABLE 1

| Attribute | Description | Unit | Valid Attribute Value(s) | Reset Value |
|---|---|---|---|---|
| DL_FCxProtectionTimeOutVal | Expiration value of a protection timer FCx_PROTECTION_TIMER for a traffic class<br>A value of zero means "OFF".<br>This Attribute is retained during hibernate. | μs | 0 to 65535 | 8191 |
| DL_FCxRetryTimeOutVal | Expiration value of a retry timer FCx_RETRY_TIMER of AFCx frame<br>A value of zero means "Disabled".<br>This Attribute is retained during Hibernate.<br>This value is recommended to be smaller than quarter or lower of the value of DL_FCxProtectionTimeOutVal, for example. | μs | 0 to 16383 | 0 |
| DL_FCxRetryNumLimit | Retry Number Limit of the FCx_RETRY_TIMER of AFCx frame<br>A value of zero means "Disabled".<br>This Attribute is retained during Hibernate.<br>It is invalid and disabled when DL_FCxRetryTimeOutVal = 0 (Disabled). | | 0 to 63 | 0 |
| DL_FCx_ECPL_En | This attribute is set to enable ECPL features of robust mode at DL layer initialization Procedure.<br>This attribute can be newly added or directly replaced by DL_FCxRetryTimeOutVal = 0 to disable ECPL feature.<br>This Attribute is retained during Hibernate.<br>1'b1: Enable to transmit AFCx frame with ECPL field = 1'b1 at the startup of DL layer initialization Procedure.<br>1'b0: Disable to transmit AFCx frame with ECPL field = 1'b1 at the startup of DL layer initialization Procedure. | | 1'b0 or 1'b1 | 1'b0 |

In addition, for example, during DL layer initialization with the enhanced frame error recovery scheme being enabled, an AFCx frame is re-transmitted with previous CReq and ECPL setting after FCx_RETRY_TIMER has expired until retry number reaches the retry number limit (DL_FCxRetryNumLimit). After DL layer initialization is completed, ECPL field is set to '1' in the next AFCx frame and FCx_RETRY_TIMER stops.

For example, the ECPL field and FCx_RETRY_TIMER are used for protecting against loss of the AFCx frame in the initialization phase. The expiration value of FCx_RETRY_TIMER is denoted by DL_FCxRetryTimeOutVal.

For example, the ECPL field and FCx_RETRY_TIMER are enabled when DL_FCxRetryTimeOutVal is not zero in the initialization phase.

For example, FCx_RETRY_TIMER runs when at least one of the following conditions is valid: the data link layer is in the initialization phase, and no AFCx frame with ECPL field set is received for a traffic class (TCx) (e.g., TC0 or TC1) after transmitting AFCx frame with CReq bit set to '1' or ECPL field set to '1'.

For example, the FCx_RETRY_TIMER can be stopped when at least one of the following conditions is valid: (1) the reception and transmission of an error-free AFCx frame with ECPL field set; (2) retry number reaches the retry number limit (DL_FCxRetryNumLimit); (3) DL_FCxRetryTimeOutVal is equal to zero. The enhanced frame error recovery scheme is disabled when DL_FCxRetryTimeOutVal is equal to zero, and ECPL field is thus required to be set to '1'.

The methods of facilitating error recovery illustrated in FIG. 3, FIG. 4A, FIG. 4B, or related embodiments can be regarded as operation methods of a local host or remote device in a variety of operation flows for error recovery that may be encountered in practical scenarios. Regarding this, scenarios involving error recovery of data link layer initialization are illustrated in the examples below.

Figure 6:
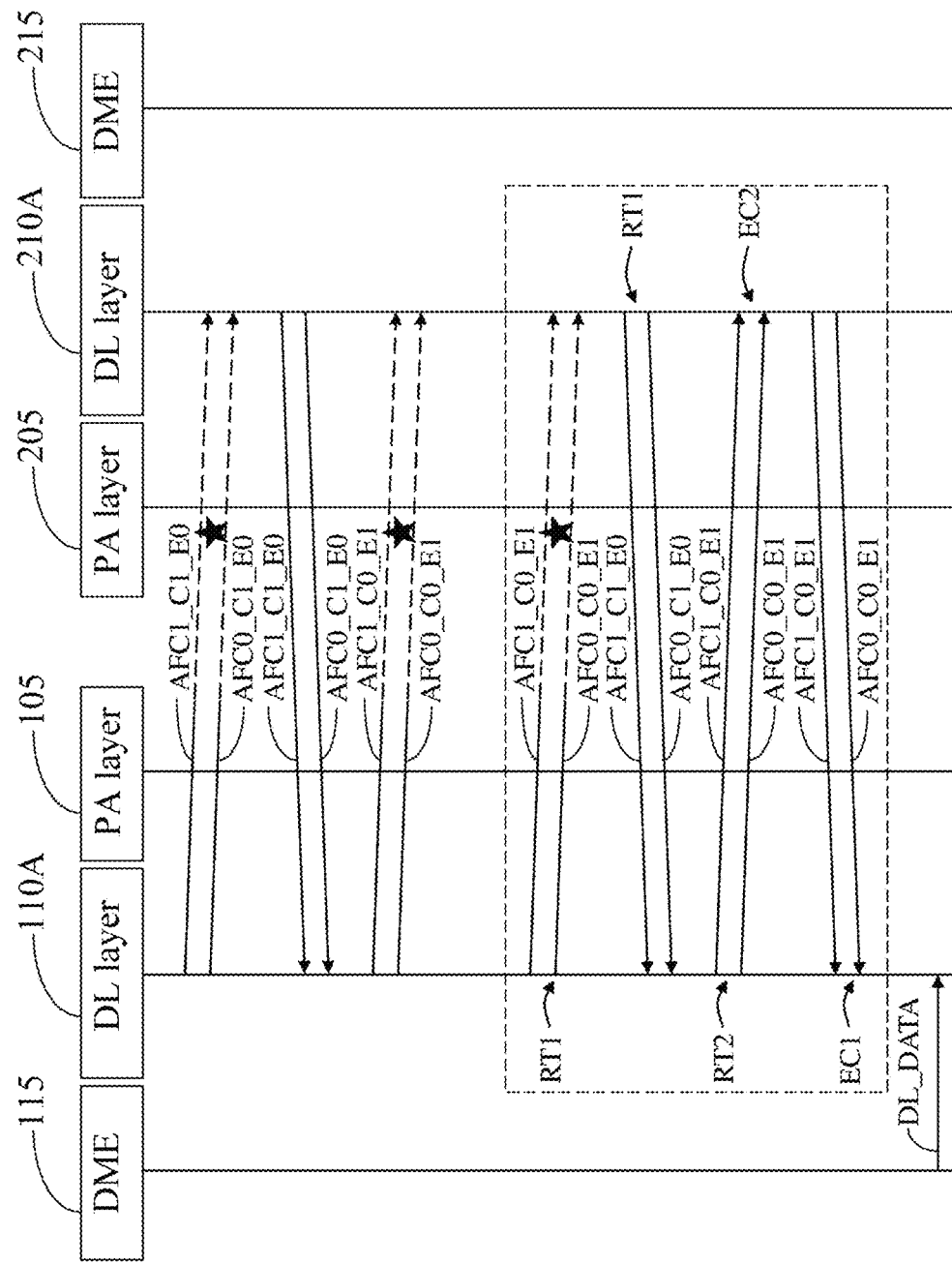
FIG. 6 is a diagram illustrating an example of an operation flow of error recovery of data link layer initialization.

Before discussion of FIG. 6, some assumptions are mentioned as follows. In FIG. 6 or similar Figures such as FIG. 7 or FIG. 8, a local host, such as the first device 10, can be represented by its protocol stack (e.g., UniPro stack) including a physical adapter (PA) layer 105, a data link (DL) layer 110A, and a device management entity (DME) 115, which can be implemented as modules in the first device 10. Likewise, a remote device, such as the second device 20, can be represented by its protocol stack (e.g., UniPro stack) including a PA layer 205, a DL layer 210A, and a DME 215, which can be implemented as modules in the second device 20. The DL layer 110A or 120A in FIG. 6 and so on can be regarded as an embodiment of the DL layer 110 or 120 in FIG. 2. In addition, an arrow with dashed portions is shown in the Figures to indicate that an AFC frame is transmitted from one side, but is not received successfully by its peer side due to an error, wherein a "star" symbol may be shown attached to the dashed portion to indicate this error for the sake of illustration. A solid arrow is shown in the Figures to indicate that an AFC frame is transmitted from one side and is received by its peer side successfully.

FIG. 6 is a diagram illustrating an example of an operation flow of error recovery of data link layer initialization. FIG. 6 shows a scenario where peer side's received path seems to have problem.

As shown in FIG. 6, the local side (e.g., the first device 10) has transmitted AFCx frames with CReq=1 and ECPL=1'b0 (e.g., two AFC frames denoted by AFC1_C1_E0 for traffic class 1 (TC1) and AFC0_C1_E0 for traffic class 0 (TC0)), wherein a retry timer restarts. Then, the local side correctly receives AFCx frames (e.g., two AFC frame denoted by AFC1_C1_E0 for TC1 and AFC0_C1_E0 for TC0), wherein the retry timer is being reset and stopped. In this case, the local side has exchanged initial credit completely and just waiting for the peer side's AFCx frame with ECPL=1'b1. The retry timer restarts after the local side transmits AFCx frames with CReq=0 and ECPL=1'b1.

At the same time, the peer side (e.g., the second device 20) has transmitted AFCx frames with CReq=1 and ECPL=1'b0 (e.g., two AFC frames denoted by AFC1_C1_E0 and AFC0_C1_E0) and the retry timer restarts. The peer side then expects any AFCx frame from the local side.

In the local side, after its retry timer expires, the local side re-transmits AFCx frames with CReq=1'b0 and ECPL=1'b1 (e.g., two AFC frames denoted by AFC1_C0_E1 for TC1 and AFC0_C0_E1 for TC0), as indicated by RT1 on the local side, and is waiting for Peer's AFCx frames with ECPL=1'b1, wherein the associated retry timer restarts.

In the peer side, after its retry timer expires, the peer side re-transmits AFCx frames with CReq=1'b1 and ECPL=1'b0, as indicated by RT1 on the peer side, and is still waiting for any Local's AFCx frame, wherein the associated retry timer restarts.

When the peer side correctly receives local side's AFCx frames (e.g., two AFC frames denoted by AFC1_C0_E1 and AFC0_C0_E1), as indicated by EC2, the peer side responds with AFCx frames with ECPL=1'b1, wherein the associated retry timer is being reset and stopped. After that, as indicated by EC1, the local side correctly receives the peer side' AFCx frames (e.g., two AFC frames denoted by AFC1_C0_E1 and AFC0_C0_E1). Eventually, both sides exchange initial control information completely, wherein the associated Retry Timer is being reset and stopped. The operation flow can then proceed with subsequent hibernate exit procedure.

Figure 7:
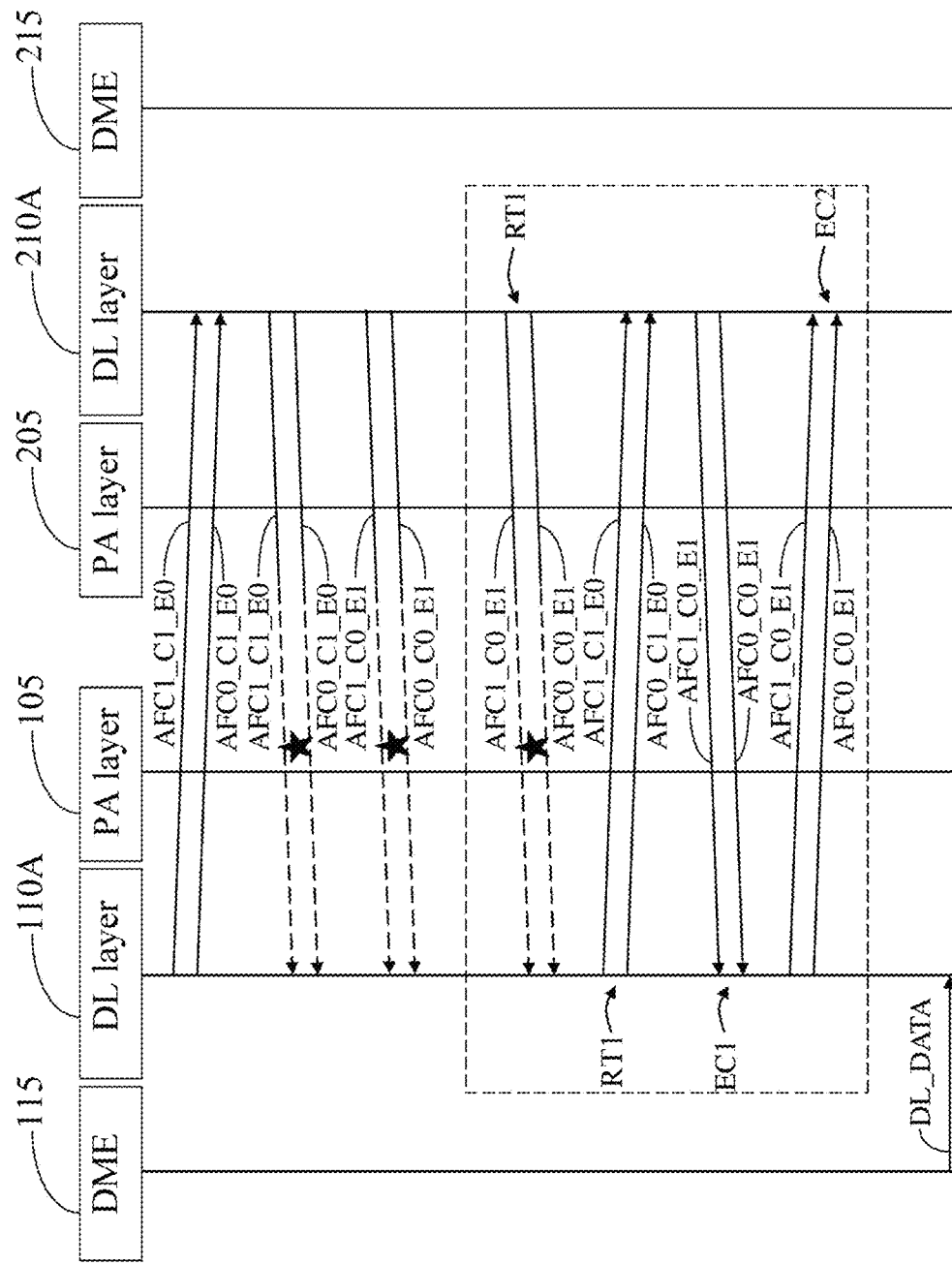
FIG. 7 is a diagram illustrating another example of an operation flow of error recovery of data link layer initialization.

FIG. 7 is a diagram illustrating another example of an operation flow of error recovery of data link layer initialization. FIG. 7 shows a scenario where peer side's transmitted path seems to have problem.

As shown in FIG. 7, the peer side has transmitted AFCx frames with CReq=1 and ECPL=1'b0 (e.g., two AFC frames denoted by AFC1_C1_E0 for TC1 and AFC0_C1_E0 for TC0), wherein a retry timer restarts. Then the peer side correctly receives AFCx frames (e.g., two AFC frames denoted by AFC1_C1_E0 and AFC0_C1_E0), wherein an associated retry timer is being reset and stopped. In this case, the peer side has exchanged initial credit completely and just waiting for the local side's AFCx frames with ECPL=1'b1. The retry timer restarts after the peer side transmits AFCx frames with CReq=0 and ECPL=1'b0 (e.g., two AFC frames denoted by AFC1_C0_E1 for TC1 and AFC0_C0_E1 for TC0).

At the same time, the local side has transmitted AFCx frames with CReq=1 and ECPL=1'b0 (e.g., two AFC frames denoted by AFC_C1_E0 and AFC0_C1_E0) and Retry Timer restarts. The local side expects any AFCx frame from the peer side.

In peer side, after the retry timer expires, the peer side re-transmits AFCx frames with CReq=1'b0 and ECPL=1'b1 (e.g., two AFC frames denoted by AFC1_C0_E1 and AFC0_C0_E1), as indicated by RT1 on the peer side, and is waiting for AFCx frames with ECPL=1'b1 from the local side, wherein the associated retry timer restarts.

In the local side, after its associated Retry Timer expires, the local side re-transmits AFCx frames with CReq=1'b1 and ECPL=1'b0 (e.g., two AFC frames denoted by AFC_C1_E0 and AFC0_C1_E0), as indicated by RT1 on the local side, and is still waiting for any AFCx frame from the peer side, wherein the associated retry timer restarts. In response to the AFCx frames from the local side, the peer side transmits AFCx frames with CReq=1'b0 and ECPL=1'b1 (e.g., two AFC frames denoted by AFC1_C0_E1 and AFC0_C0_E1).

When the local side correctly receives the peer side's AFCx frames (the associated retry timer being reset and stopped), as indicated by RC1 on the local side, the local side responds with AFCx frames with ECPL=1'b1 (e.g., two AFC frames denoted by AFC1_C0_E1 and AFC0_C0_E1). The peer side correctly receives the local side's AFCx frames (the associated retry timer being reset and stopped), as indicated by RC2 on the peer side. Eventually, both sides exchange initial control information completely. The operation flow can then proceed with subsequent hibernate exit procedure.

Figure 8:
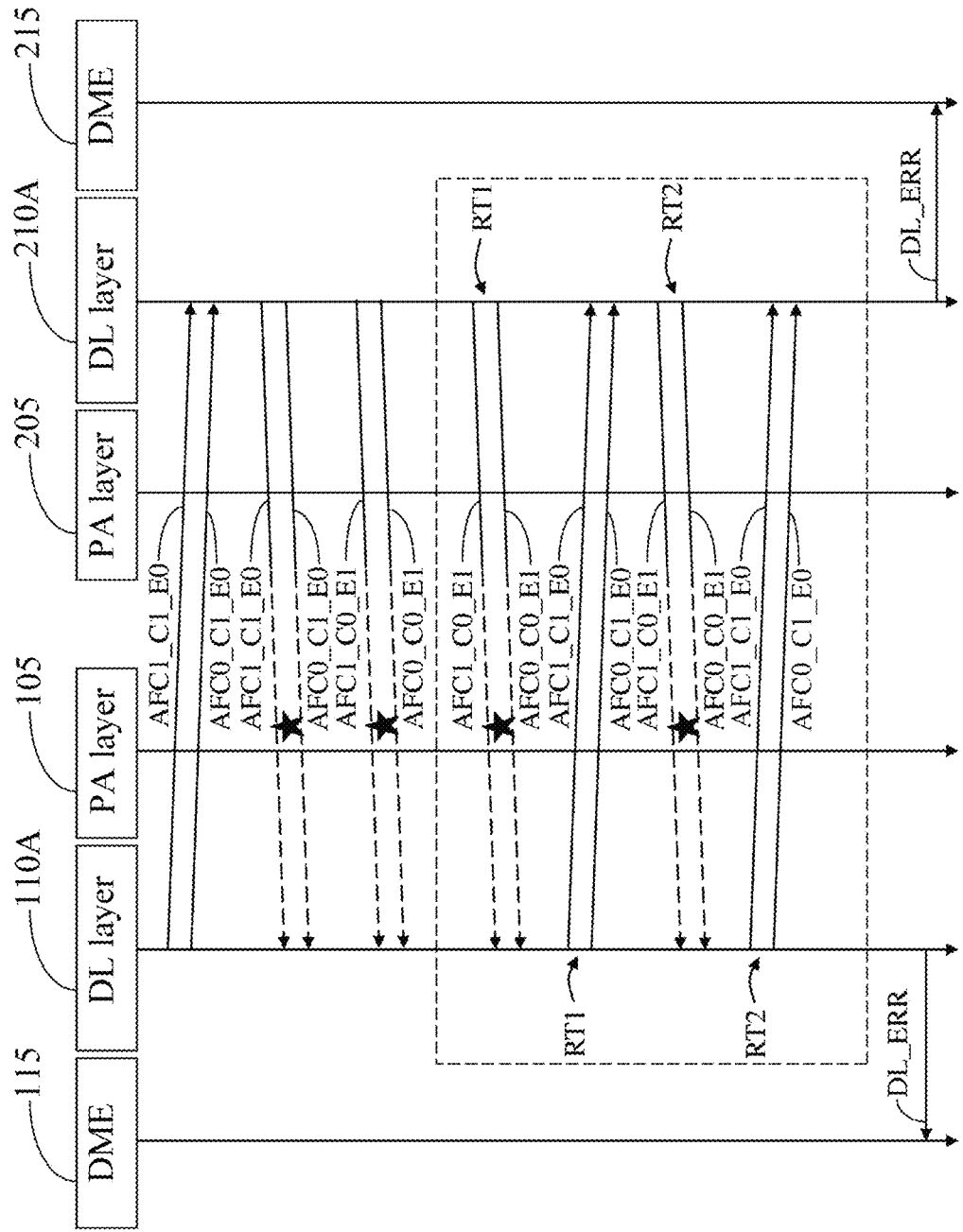
FIG. 8 is a diagram illustrating another example of an operation flow of error recovery of data link layer initialization.

FIG. 8 is a diagram illustrating another example of an operation flow of error recovery of data link layer initialization. After the local side transmits AFCx frames with CReq=1 and ECPL=1'b1, an associated retry timer expires and thus the local side re-transmits the AFCx frames to the peer side, as indicated by RT1 on the local side. For the second retry of the AFCx frames, as indicated by RT2 on the local side, the associated retry timer still expires and the retry number reaches a retry number limit. FIG. 8 shows that a fatal error occurs when the associated retry number reaches the retry number limit (e.g., greater or equal to DL_FCxRetryNumLimit) on both sides or either the local or remote side. In this case, the DL layer can follow protection timer's mechanism (e.g., as described in UniPro version 2.0 or so on) and transmit an error indication (such as a signal or message or so on, denoted by DL_ERR) to DME Layer 115 or 215 to notify an application layer to do error recovery earlier while the protection timer is still running. For example, the error indication can be regarded as an implementation of a primitive denoted by DL_LM_ERROR.ind, as described in the UniPro specification, with a new dedicated primitive parameter (e.g., DL_INIT_ERROR) indicating an error event in the DL layer initialization.

In addition, the operation flow shown in FIG. 6, FIG. 7, or FIG. 8 can be derived from and performed according to the UniPro specification (such as UniPro version 2.0 or so on) with modifications to implement the enhanced frame error recovery error recovery of data link layer initialization, for example, on the hibernate exit procedure. Certainly, the operation flows can also be applied to other procedure, such as link startup procedure, according to UniPro specification or its modified version.

Figure 9A:
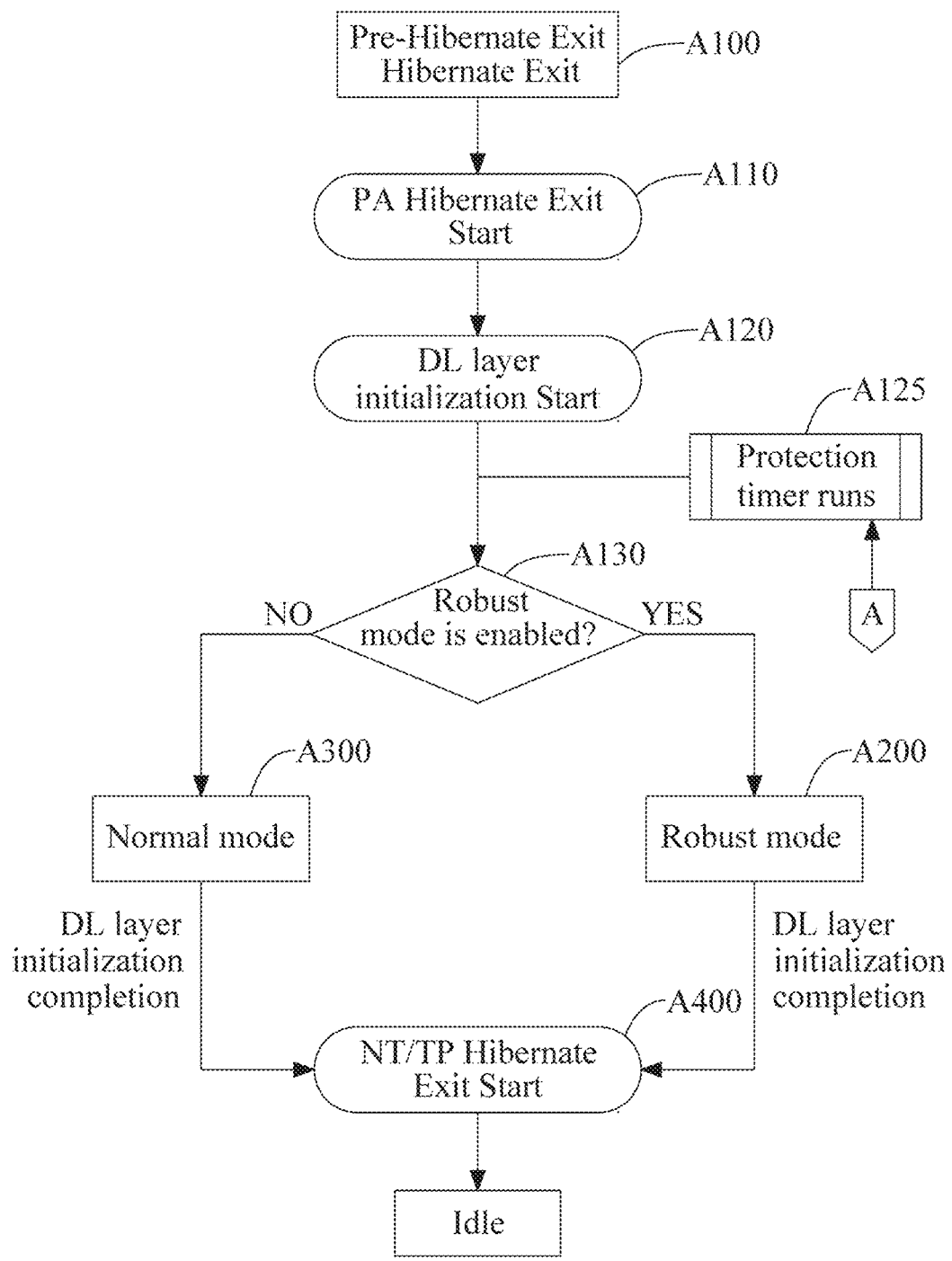
FIG. 9A is a diagram illustrating an embodiment of an operation flow of a hibernate exit process including error recovery of data link layer initialization.

FIG. 9A is a diagram illustrating an embodiment of an operation flow of a hibernate exit process including error recovery of data link layer initialization. In this embodiment, a device on the local side (or remote side) can be implemented to support normal DL layer initialization procedure (referred to as "normal mode") or DL layer initialization procedure with an enhanced frame error recovery scheme (referred to as "robust mode"), selectively. FIG. 9A can be implemented as a finite state machine operable in an electronic device (such as the first device 10 or second device 20; or both of them). The hibernate exit process includes operations as follows.

In operation A100, pre-hibernate exit procedure and hibernate exit procedure start. For example, these procedures can be derived from or according to those described in a UniPro specification (e.g., UniPro version 2.0 or so on).

In operation A110, PA hibernate exit procedure starts. For example, the PA hibernate exit procedure can be derived from or according to that described in a UniPro specification (e.g., UniPro version 2.0 or so on).

In operation A120, DL layer initialization procedure starts after the PA hibernate exit procedure is done. For example, the DL layer initialization procedure can be derived from or according to that described in a UniPro specification (e.g., UniPro version 2.0 or so on).

In operation A125, a protection timer runs for each traffic class when it is needed.

In operation A130, it is determined whether the robust mode is enabled (or active). If the robust mode is enabled, the hibernate exit process proceeds to operation A200 to perform the operation flow of the robust mode. If the robust mode is not enabled, it indicates a normal mode is to be entered as indicated by operation A300. If the robust mode or the normal mode is performed and the DL layer initialization is completed successfully, the subsequent procedures (such as network layer (NT) or transport layer (TP) hibernate exit procedure) start, as indicated by operation A400. After that, an idle state is entered.

Figure 9B:
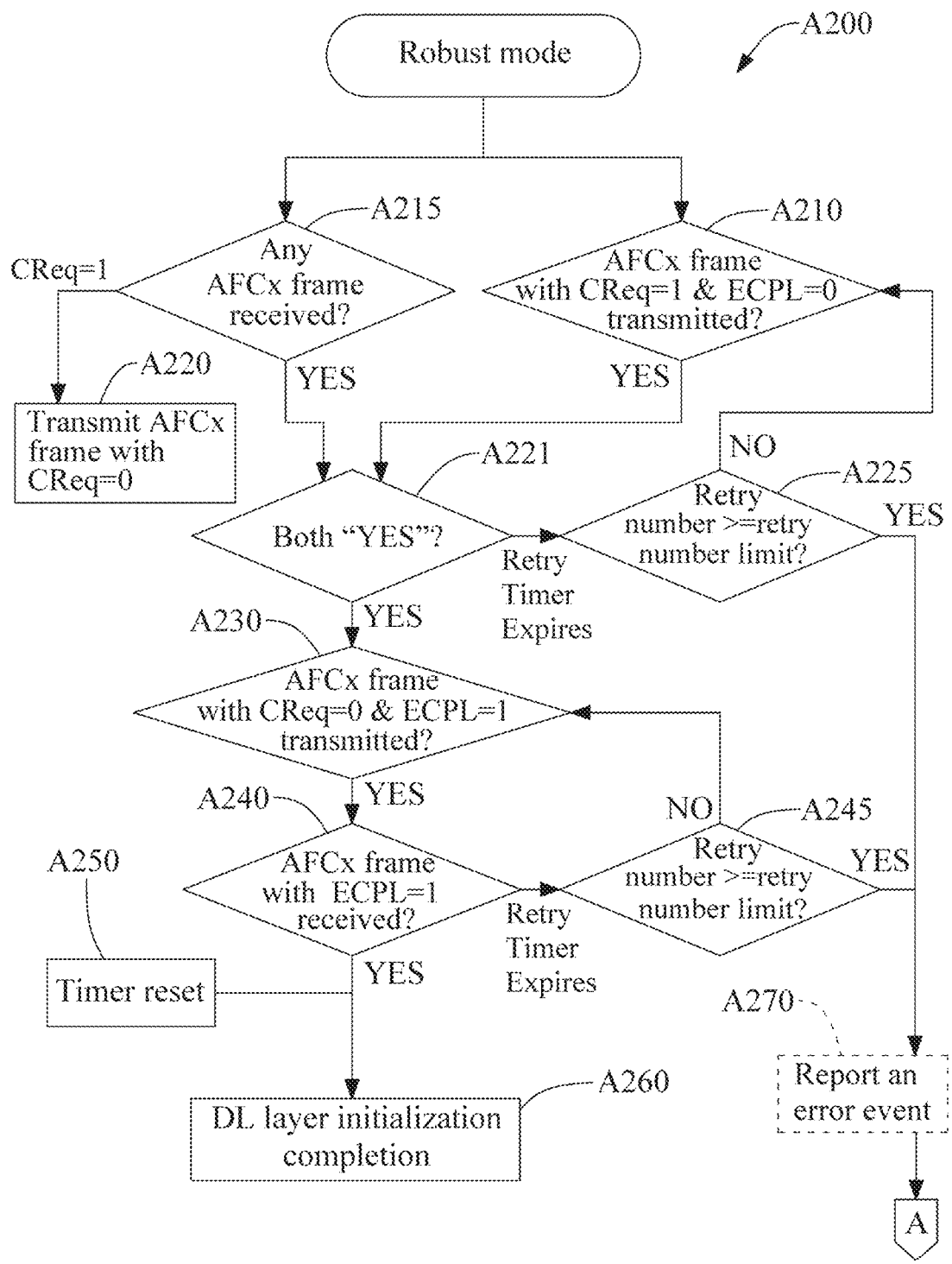
FIG. 9B is a diagram illustrating an embodiment of an operation flow of error recovery of data link layer initialization with respect to a robust mode.

Referring to FIG. 9B, an embodiment of the operation flow of error recovery of data link layer initialization with respect to a robust mode is illustrated. The operation flow can be regarded as an embodiment of the operation A200 in FIG. 9A. FIG. 9B can also be implemented as a finite state machine operable in an electronic device (such as the first device 10 or second device 20, or both of them). The operation flow can be applied to each traffic class, whenever appropriate. The operation flow includes operations as follows.

In operation A210, it is determined whether an AFCx frame with CReq=1 and ECPL=0 for a traffic class is transmitted. When the AFCx frame with CReq=1 and ECPL=0 for the traffic class is transmitted, a retry timer associated with the transmission of the AFCx frame starts for the traffic class.

In operation A215, it is determined whether any AFCx for the traffic class is received. If so, the process proceeds to operation A221. At operation A215, if it is determined that an AFCx frame for the traffic class is received and the AFCx frame has its CReq equals '1', operation A220 is also performed to transmit an AFCx frame with CReq=0 for the traffic class to the peer side.

In operation A221, it is determined whether both criteria of operations A215 and A210 for the traffic class are satisfied. If so, operation A230 is performed. If it is not both of the criteria are satisfied and the associated retry timer expires, operation A225 is performed.

In operation A225, it is determined whether a retry number is greater than or equal to a retry number limit. The retry number represents the number of re-transmitting an AFCx frame with CReq=1 and ECPL=0 for the traffic class. If it is the first time to transmit such an AFCx frame, the retry number can be set to 0; if it is the second time to transmit it, the retry number can be set to 1, and so on. If the retry number is greater than or equal to the retry number limit (e.g., 2), the process proceeds to other operations, for example, a mechanism regarding the protection timer as described in the UniPro specification (e.g., UniPro version 2.0 or so on), and in addition, operation A270 can be performed to report an error event indicating DL layer initialization error before the expiration of the protection timer. If the retry number is less than the retry number limit, it indicates that an AFCx frame with CReq=1 and ECPL=0 for the traffic class can be re-transmitted. The retry timer is reset and stopped and then operation A210 is performed.

In operation A230, it is determined whether an AFCx frame with CReq=0 and ECPL=1 for the traffic class is transmitted. If so, operation A240 is performed. When the AFCx frame with CReq=O and ECPL=1 is transmitted, a retry timer associated with the transmission of the AFCx frame starts.

In operation A240, it is determined whether an AFCx frame with ECPL=1 for the traffic class is received. If it is determined that an AFCx frame with ECPL=1 for the traffic class is not received and the associated retry timer expires, operation A245 is performed. If it is determined that an AFCx frame with ECPL=1 for the traffic class is received, it indicates that DL layer initialization for the traffic class is completed, as denoted by operation A260. If the DL layer initialization is completed for each traffic class (e.g., both TC0 and TC1), the process proceeds with the operation flow of FIG. 9A.

In operation A245, it is determined whether a retry number is greater than or equal to a retry number limit. The retry number here represents the number of re-transmitting an AFCx frame with CReq=0 and ECPL=1 for the traffic class. If it is the first time to transmit such an AFCx frame, the retry number can be set to 0; if it is the second time to transmit it, the retry number can be set to 1, and so on. If the retry number is greater than or equal to the retry number limit (e.g., 2), the process proceeds to other operations, for example, the mechanism regarding the protection timer as described in the UniPro specification (e.g., UniPro version 2.0 or so on), and in addition, operation A270 can be performed to report an error event indicating DL layer initialization error before the expiration of the protection timer. If the retry number is less than the retry number limit, it indicates that an AFCx frame with CReq=0 and ECPL=1 for the traffic class can be re-transmitted. The retry timer is reset and stopped and then operation A230 is performed.

In operation A250, timers such as the retry timer and protection timer are reset.

The operation flow of FIG. 9B can be regarded as an embodiment according to or derived from the method of FIG. 4A, FIG. 4B, or related embodiments. By using the method, error recovery of data link layer initialization can be performed effectively and more efficiently.

On the other hand, operation A300 in FIG. 9A represents the operation flow of the normal mode, for example, according to the UniPro specification (e.g., UniPro version 2.0) to exchange flow control information for each traffic class. For example, after reception of the DL_LM_LINKSTARTUP.req or the DL_LM_HIBERNATE_EXIT.req primitive, the DL layer will first transmit the AFC frame for TC1 (denoted by AFC1) and then transmit the AFC frame for TC0 (denoted by AFC0). Both AFC frames will have the CReq bit set to 1. The frame sequence number and the credit value carried by these two AFC frames are the reset values of the last acknowledged frame sequence number (e.g., "31" as described in UniPro 2.0 Section 6.6.8) and number of accumulated credits A (e.g., the size of the receiving logical buffer in credit units as described in UniPro2.0 Section 6.6.7) for the two traffic classes, respectively. As long as the first AFCx frame has not been received, the protection timer FCx_PROTECTION_TIMER runs (see UniPro2.0 Section 6.6.7). The FCx_PROTECTION_TIMER can behave according to UniPro2.0 Section 6.6.7, for example. In the normal mode, when one AFCx frame is received for each traffic class, the initial credit exchange and thus DL Layer initialization are considered complete.

As compared to the normal mode of operation A300, the robust mode of operation A200 in the embodiment operates differently in the beginning stage when doing DL layer initialization procedure for each traffic class. For example, the local side transmits AFCx frame with CReq=1'b1 and ECPL=1'b0 in the beginning stage when doing DL layer initialization procedure, wherein DL_FCx_ECPL_En is enabled and the retry timer restarts. On receiving any AFCx frame (Retry Timer being reset and stopped), the local side transmits an AFCx frame with ECPL=1'b1 (retry timer being restarted). Then the local side is expected to receive an AFCx frame with ECPL=1'b1 from the peer side.

Following the embodiment of the above operation flow for the robust mode, after the local side transmits an AFCx frame with CReq=1'b1 for a traffic class and before the associated retry timer expires, the local side can determine the completion of DL layer initialization for the traffic class when the local side receives an AFCx frame with ECPL=1'b1 for the traffic class from the peer side.

In addition, when the local side does not receive any AFCx frame from the peer side and the associated retry timer expires, the local side re-transmits an AFCx frame with CReq=1'b1 and ECPL=1'b0, wherein the associated retry timer being restarted. After the retry number reaches the retry number limit (e.g., DL_FCxRetryNumLimit), the DL layer can follow the protection timer's mechanism (e.g., as described in the UniPro version 2.0 or so on). In this case, meanwhile, the local side can report to the DME by transmitting an error indication (e.g., a primitive DL_LM_ERROR.ind with a primitive parameter indicating an error event in DL layer initialization, or so on).

Further, when the local side receives any AFCx frame but its ECPL field is still equal to 1'b0 and the associated retry timer expires, the local side can re-transmit an AFCx frame with CReq=1'b0 and ECPL=1'b1 and restart the retry timer until the local side receives an AFCx frame with ECPL=1'b1 and thus resets and stops the retry timer. After the retry number reaches the retry number limit (e.g., DL_FCxRetryNumLimit), the DL layer can follow the protection timer's mechanism (e.g., as described in UniPro version 2.0 or so on). In this case, meanwhile, the local side can report to the DME by transmitting an error indication (e.g., a primitive DL_LM_ERROR.ind with a primitive parameter indicating an error event in DL layer initialization, or so on).

In addition, receiving a peer side's any AFCx frame on a local side is to verify whether an associated local receiving path is correctable or not.

Further, receiving a peer side's AFCx frame with ECPL=1'b1 on a local side is to verify whether an associated local transmitting path is correctable or not.

Accordingly, the embodiments provided above can be implemented to make sure that flow control information exchanges of both sides complete robustly and truly (e.g., by ECPL field or other equivalent approach) and speed up error recovery of DL layer initialization (e.g., using a retry timer with a shorter expiration time; when a DL layer initialization error occurs, reporting to DME an error event indicating the DL layer initialization error before the expiration of the protection timer).

Another technical effect of the robust mode is that it does not affect current operation even the host application (or peer side) does not support ECPL field but the device (or local side) implements it, or vice versa, as discussed below.

Following the embodiments of the robust mode above, regarding compatibility, in some scenarios, a device implementing the robust mode (or referred as a robust-mode compliant device) can be compatible with a host or device not supporting the robust mode (or referred to as a robust-mode non-compliant device). The operations of the device are not affected even one side does not support ECPL field while another side implements the robust mode, for the following reasons. Firstly, ECPL (regarding Exchanging initial credit ComPLetely) field does not affect current implementation, which does not support the robust mode, because a device according to the UniPro specification (e.g., UniPro version 2.0)) and not supporting the robust mode transmits an AFC frame with the reserved bit set to a default value of 1'b1, which a device supporting the robust mode just treats as credit exchange completion, without deadlock issue. Meanwhile, a data link receiver of the device not supporting the robust mode will ignore the ECPL field (e.g., ECPL=0, indicated by a reserved bit of the parameter field) in an AFC frame which is transmitted by the device supporting the robust mode. Secondly, retry timer scheme does not affect current implementation, which does not support the robust mode, and can still be implemented even though no ECPL field because an AFCx frame with CReq=1'b1 or 1'b0 frame can be transmitted more (e.g., just following rules for AFC frame transmission) without any UniPro version 2.0 limitation. The ECPL and retry timer are two kinds of approaches in parallel and can be implemented or controlled (e.g., enabling ECPL field and Retry Timer) separately. Thirdly, for the error indication, such as the primitive DL_LM_ERROR.ind with a primitive parameter DL_INIT_ERROR, the primitive parameter DL_INIT_ERROR may be set to a value (e.g., 17 or above) different from what is defined in the UniPro specification, wherein the primitive parameter of the primitive DL_LM_ERROR.ind ranges from 1 to 16 in UniPro version 2.0. The primitive parameter DL_INIT_ERROR can be interpreted and decoded by an application layer (e.g., corresponding firmware for error recovery operations) of the device supporting the robust mode. On the other hand, the primitive parameter DL_INIT_ERROR can be silently discarded, being ignored, or being regarded as a fatal error in an device not supporting the robust mode without affecting operation in its application layer because an error has occurred and the application layer will recovery this error situation even the primitive DL_LM_ERROR.ind's value is not the expected one according to the UniPro specification (e.g., UniPro version 2.0).

Certainly, the implementation of the robust mode or the method according to FIG. 3, FIG. 4A, or FIG. 4B is not limited to the above embodiments or embodiment of FIGS. 9A and 9B. The robust mode in some embodiments can be implemented in a host or remoted device without using the normal mode. For example, both the host device and remote device can be implemented with the robust mode for DL layer initialization, instead of the normal mode. In addition, the implementation of the robust mode or the method according to FIG. 3, FIG. 4A, or FIG. 4B are not limited to the examples of the values of the attributes or parameters as described above. Further, the implementation of the robust mode or the method according to FIG. 3, FIG. 4A, or FIG. 4B are not limited to the form of the AFC frames. The "first AFC frame" (e.g., AFC-A1) or "second AFC frame" (e.g., AFC-A2) of the embodiment of FIG. 3 or related embodiments can be implemented by using an AFC frame in which a new control data field, at least one reserved bit(s), or a field for indicating a credit transmit request (e.g., a CReq bit indicated by CR in FIG. 5)(or even a combination of them) is used as the "first indicator" or "second indicator" of the embodiment of FIG. 3 or related embodiments. Accordingly, some embodiments can also be derived from the embodiments of FIGS. 6-8, 9A-9B, using other implementation of AFC frames as mentioned above, instead of ECPL fields in AFC frames.

Figure 10:
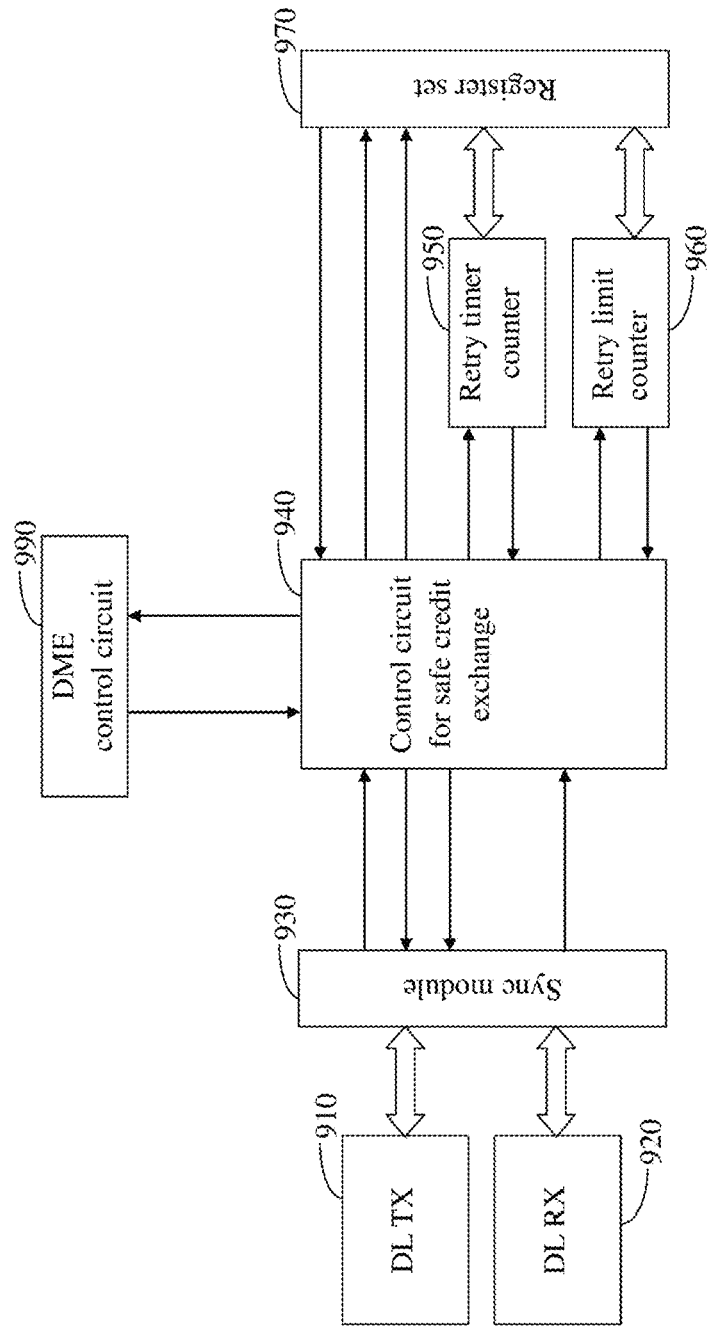
FIG. 10 is a diagram illustrating an embodiment of circuit architecture for error recovery of data link layer initialization.

FIG. 10 is a diagram illustrating an embodiment of circuit architecture for error recovery of data link layer initialization. The circuit architecture can be applied to a controller of an electronic device (e.g., the first device 10 or second device 20 of one or more embodiments above) to facilitate implementation of error recovery of data link layer initialization, according to one or more of embodiments of FIG. 3, FIG. 4A, FIG. 4B, FIG. 9A, FIG. 9B, or related embodiments, whenever appropriate. In addition, the circuit architecture can be used to implement the embodiments of the method of facilitate data link layer initialization, regardless of the implementation of the "first AFC frame" (e.g., AFC-A1) and "second AFC frame" (e.g., AFC-A2) of the embodiment of FIG. 3 or related embodiments. As shown in FIG. 10, the circuit architecture includes a data link transmitter (DL TX) 910, a data link receiver (DL RX) 920, a synchronization module 930, a control circuit 940 for safe credit exchange, a retry timer counter 950, and a retry limit counter 960.

The control circuit 940 for safe credit exchange can be used to perform a method for facilitating data link layer initialization according to FIG. 3, FIG. 4A, FIG. 4B, or related embodiments. The synchronization module 930 is coupled among the DL TX 910, DL RX 920, and the control circuit 940 for safe credit exchange for data synchronization. The control circuit 940 is coupled to a device management entity (DME) control circuit 990. The DME control circuit 990 serves as an interface to an application layer, which may receive a request signal for link startup procedure or hibernate exit procedure to the control circuit 940. After completion of the link startup procedure or hibernate exit procedure, the control circuit 940 transmits a confirmation signal to the DME control circuit 990. During the link startup procedure or hibernate exit procedure, the control circuit 940 implements the method according to FIG. 3, FIG. 4A, FIG. 4B, FIG. 9B, or related examples to enable the retry timer counter 950 when an AFC frame with a first indicator (e.g., ECPL=0) or an AFC frame with a second indicator (e.g., ECPL=1) is transmitted, and to enable the retry limit counter 960 for counting a retry number for transmitting the AFC frame and transmitting an indication of error when the retry number reaches a threshold (or called retry number limit). In addition, the control circuit 940 can access to a register set 970 in which the attributes for DL layer initialization are stored, such as those attributes shown in TABLE 1. For example, the register set 970 may have a register storing an attribute (e.g., DL_FCx_ECPL_En) with a value of 1'b1 and outputting a signal asserted to notify the control circuit 940 that a robust mode is enabled so that the control circuit 940 is operable according to the method of facilitate data link layer initialization illustrated in FIG. 3, FIG. 4A, FIG. 4B, or related embodiments, such as FIG. 9A and FIG. 9B. In an example, the control circuit 940 can be implemented based on the operation flow of FIG. 4A and FIG. 9B for safe credit exchange (e.g., the enhanced frame error recovery scheme or referred to as robust mode). In an example of the safe credit exchange based on FIG. 4A and FIG. 9B, the control circuit 940 can transmit a request signal for requesting the DL TX 910 to transmit an AFC frame with CReq or ECPL set to appropriate values, or can receive, from the DL RX 920, an indication signal for indicating that an AFC frame is received with a specific value of CReq or ECPL. In addition, the control circuit 940 can determine whether a proper AFC frame is transmitted or received, or perform the error recovery operation to retry, based on the operation flow of FIG. 9B.

The following provides various embodiments for implementation to facilitate data link layer initialization.

Figure 11A:
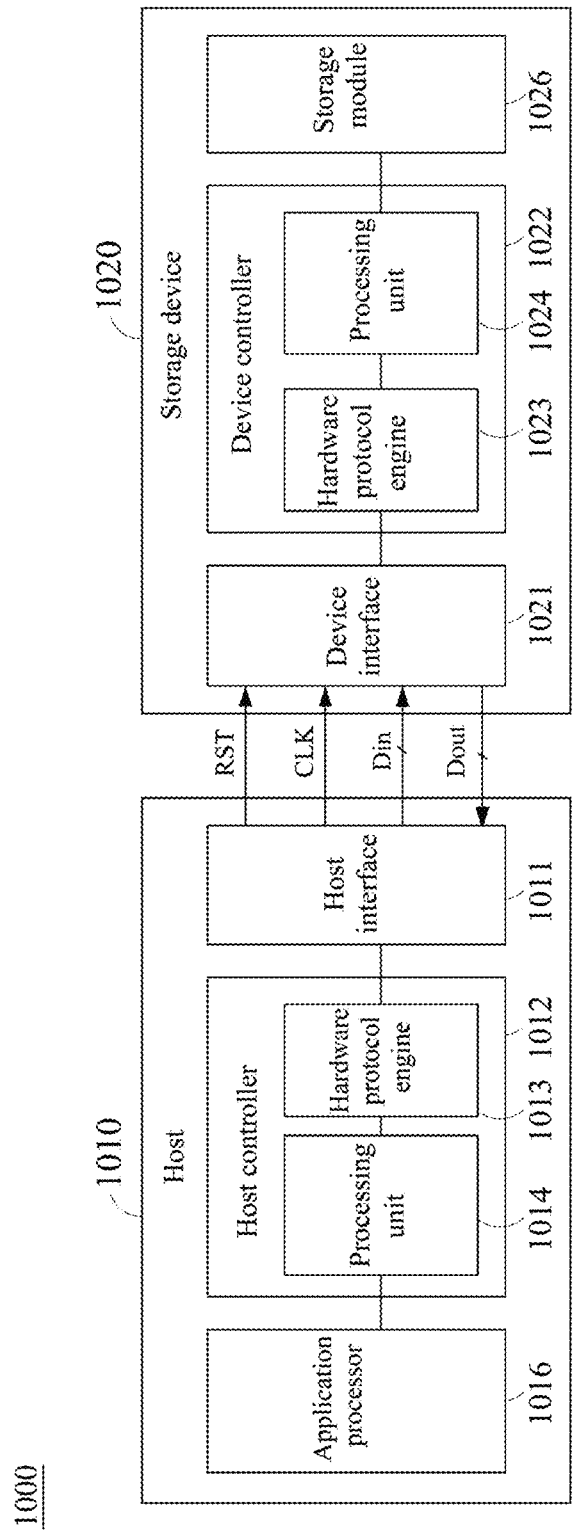
FIG. 11A is a diagram illustrating circuit architecture of a storage system for an interconnection protocol according to an embodiment of the present disclosure.
Figure 11B:
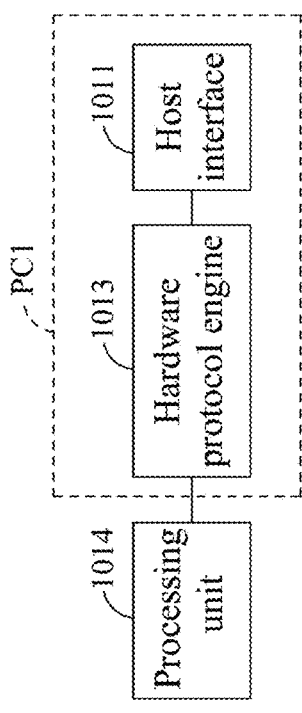
FIG. 11B is a block diagram illustrating circuit architecture applicable to the controller in FIG. 11A for the interconnection protocol according to an embodiment of the present disclosure.
Figure 11C:
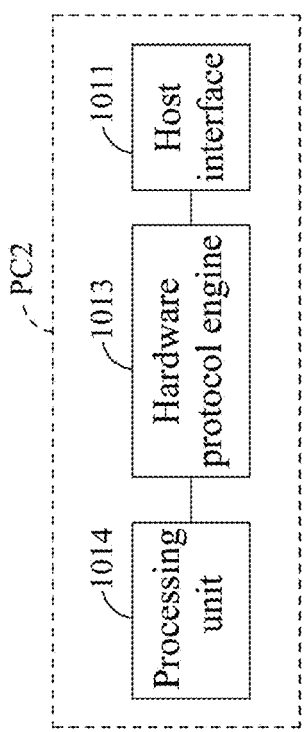
FIG. 11C is a block diagram illustrating circuit architecture applicable to the controller in FIG. 11A for the interconnection protocol according to an embodiment of the present disclosure.

Referring to FIG. 11A, a diagram of circuit architecture is shown according to an embodiment of the present disclosure. As shown in FIG. 11A, a storage system 1000 includes a host 1010 and a storage device 1020. The host 1010 and the storage device 1020 communicate through an interconnection protocol in between, thereby allowing the host 1010 to perform data access of the storage device 1020. The interconnection protocol is capable of performing the method mentioned above based on FIG. 3, FIG. 4A, FIG. 4B, or any one or more of the embodiments above. According to the circuit architecture in FIG. 11A, the foregoing technique is applicable to a first device 10 of one or more of the embodiments above capable of communicating with a second device 20 of one or more of the embodiments above according to the interconnection protocol, wherein the host 1010 and storage device 1020 can be used to implement the first device 10 and second device 20 respectively, or vice versa. In the circuit architecture of FIG. 11A, a controller in the host 1010 or the storage device 1020 used to implement the interconnection protocol may be implemented by various configurations. As shown in FIG. 11A, the controller (for example, a host controller 1012) in the host 1010 used to implement the interconnection protocol or the controller (for example, a device controller 1022) in the storage device 1020 used to implement the interconnection protocol can be implemented as circuit architecture including a hardware protocol engine and a processing unit, wherein the processing unit of the controller is optional. In another example, as shown in FIG. 11B, the controller in the host 1010 used to implement the interconnection protocol is referred to as, for example, a protocol controller PC1, which can be configured to include a host interface 1011 and a hardware protocol engine 1013 and be implemented as a single chip, wherein a processing unit 1014 may be regarded as an external circuit of the protocol controller PC1. Moreover, similarly, the controller (or referred to as a protocol controller of the storage device 1020) in the storage device 1020 used to implement the interconnection protocol can be configured to include a device interface 1021 and a hardware protocol engine 1023 and be implemented as a single chip, wherein a processing unit 1024 may be regarded as an external circuit of the protocol controller. For another example, as shown in FIG. 11C, the controller in the host 1010 used to implement the interconnection protocol, for example, a protocol controller PC2, can be configured to include the host interface 1011, the hardware protocol engine 1013 and the processing unit 1014, and be implemented as a single chip. Moreover, similarly, the controller (or referred to as a protocol controller of the storage device 1020) in the storage device 1020 used to implement the interconnection protocol can be configured to include the device interface 1021, the hardware protocol engine 1023, and the processing unit 1024, and be implemented as a single chip. Thus, according to the circuit architecture in FIG. 11A, the controller used to implement the interconnection protocol in the host 1010 or the storage device 1020 can be regarded to cover or represent the embodiment based on FIG. 11A, FIG. 11B, or FIG. 11C. The description of other examples related to FIG. 11A is also suitable for the embodiments based on FIG. 11A, FIG. 11B, or FIG. 11C.

The circuit architecture shown in FIG. 11A has sufficient flexibilities and can be efficiently configured to meet requirements of different products, so as to adapt to diversified designs of manufacturers for better product development. The host 1010 is, for example, a computing device such as a smartphone, a tablet computer, a multimedia device, or other electronic devices. The storage device 1020 is, for example, a storage device inside or outside the computing device, and is such as a storage device based on a non-volatile memory. The storage device 1020 is capable of being written with data under control of the host 1010 or providing written data to the host 1010. The storage device 1020 can be implemented as an internal memory device, memory card, solid state drive (SSD), or so on; however, the implementation of the present disclosure is not limited to the examples above.

The host 1010 includes the host interface 1011, the host controller 1012, and an application processor 1016.

The host interface 1011 implements a physical layer of the interconnection protocol so as to link to the storage device 1020. For example, the host interface 1011 implements a modified version of physical (M-PHY) layer as exemplified above.

The host controller 1012 is coupled between the host interface 1011 and the application processor 1016. When the application processor 1016 needs to perform data access of the storage device 1020, it transmits a corresponding access operation command or write data to the host controller 1012 and communicates with the storage device 1020 through the interconnection protocol, thereby completing data access of the storage device 1020.

The host controller 1012 includes, for example, the hardware protocol engine 1013 and the processing unit 1014, wherein the processing unit 1014 is optional.

The hardware protocol engine 1013 implements a link layer of the interconnection protocol. The link layer can be implemented according to a modified version of UniPro as exemplified above. The hardware protocol engine 1013 communicates with the host interface 1011 and the processing unit 1014 and performs data conversion according to the specification of the link layer. In addition, the hardware protocol engine 1013 (or the host controller 1012) can be regarded as an embodiment of the link controller 100 of the first device 10 shown in FIG. 2.

The processing unit 1014 is coupled to the hardware protocol engine 1013, and communicates with the application processor 1016. The processing unit 1014 can execute one or more pieces of firmware. For example, an access operation command or write data output by an operating system, a driver, or an application executed by the application processor 1016 is converted into a command or data in a format compliant with the link layer of the interconnection protocol by the firmware executed by the processing unit 1014, and is then output to the hardware protocol engine 1013 for processing according to specification of the link layer. Alternatively, read data returned by the storage device 1020 in response to a read command of the host 1010 is returned to the hardware protocol engine 1013 according to the specification of the link layer of the interconnection protocol, and is converted by the corresponding firmware executed by the processing unit 1014 into data in a format that is compliant with and readable by the operating system, driver, or application executed by the application processor 1016. The firmware can be stored, for example, in an internal memory of the processing unit 1014, or be stored in an internal memory of the host controller 1012, wherein the internal memory can include a volatile memory and a non-volatile memory. The processing unit 1014 is optional, that is, the task of the firmware above may be implemented in the hardware protocol engine 1013 in hardware.

The storage device 1020 includes the device interface 1021, the device controller 1022, and a storage module 1026.

The device interface 1021 implements a physical layer of the interconnection protocol to link to the host 1010. For example, the device interface 1021 is for implementing a modified version of physical (M-PHY) layer as exemplified above.

The device controller 1022 is coupled between the device interface 1021 and the storage module 1026. The device controller 1022 has functions corresponding to or similar to those of the host controller 1012 described above, with respect to the interconnection protocol. When the host 1010 issues and transmits an access operation command or write data to the storage device 1020 through the interconnection protocol, the device controller 1022 converts the received data into a corresponding access operation command or write data through the interconnection protocol so as to facilitate data access to be performed by the storage module 1026. Alternatively, the device controller 1022 returns, according to the link layer of the interconnection protocol, read data returned by the storage device 1020 in response to the read command of the host 1010 to the host 1010. The storage module 1026 includes, for example, a memory chip of one or more non-volatile memories, and is, for example, a flash memory chip. In one example, the storage device 1020 may further include a flash memory controller. The flash memory controller is coupled between the device controller 1022 and the storage module 1026, and can be configured to control write, read, or erase operations of the storage module 1026, and is capable of performing data exchange with the storage module 1026 through an address bus or a data bus. In another example, the flash memory controller may be further provided in the device controller 1022.

The device controller 1022 includes, for example, the hardware protocol engine 1023 and the processing unit 1024, wherein the processing unit 1024 is optional.

The hardware protocol engine 1023 implements a link layer of the interconnection protocol. The link layer can be implemented according to a modified version of UniPro as exemplified above. The hardware protocol engine 1023 communicates with the device interface 1021 and the processing unit 1024 and performs data conversion according to the specification of the link layer. In addition, the hardware protocol engine 1023 (or the device controller 1022) can be regarded as an embodiment of the link controller 200 of the second device 20 shown in FIG.

The processing unit 1024 is coupled to the hardware protocol engine 1023, and communicates with the host 1010 through the device interface 1021. The processing unit 1024 can execute one or more pieces of firmware. For example, the processing unit 1024 executes one or more pieces of firmware to communicate with the above flash memory controller, so as to exchange data such as an access operation command, write data or read data between the interconnection protocol and the flash memory controller. The firmware can be stored, for example, in an internal memory of the processing unit 1024, an internal memory of the device controller 1022, or a predetermined storage region of the storage module 1026, wherein the internal memory can include a volatile memory and a non-volatile memory.

As shown in FIG. 11A, the host interface 1011 can be coupled to the device interface 1021, for example, through data lines Din and Dout for transmitting and receiving data, a reset line RST for transmitting a hardware reset signal, and a clock line CLK for transmitting a clock signal. The data lines Din and Dout can be implemented in multiple pairs, wherein one pair of data lines Din or one pair of data lines Dout can be referred to as a lane for transmitting differential signals, for example. The host interface 1011 can communicate with the device interface 1021 by using at least one interface protocol, however, the implementation of the disclosure is not limited to the examples above. Under a modified version of the UFS standard, the host 1010 and the storage device 1020 may also be configured with multiple lanes in between to improve transmission efficiency, wherein either of the directions from the host 1010 to the storage device 1020 or from the storage device 1020 to the host 1010 can support one or more lanes, and the multiple lanes can be selectively set to be active or inactive.

A modified version of the UFS standard is taken as an example of the interconnection protocol. The UFS standard includes a UFS command set (UCS) layer, a UFS transport (UTP) layer, and a UFS interconnect (UIC) layer. The UIC layer includes a link layer and a physical layer. In the interconnection protocol, the link layer of the UIC layer can be implemented according to a modified version of the UniPro specification, and the physical layer of the UIC layer can be implemented according to a modified version of the M-PHY specification.

Figure 12:
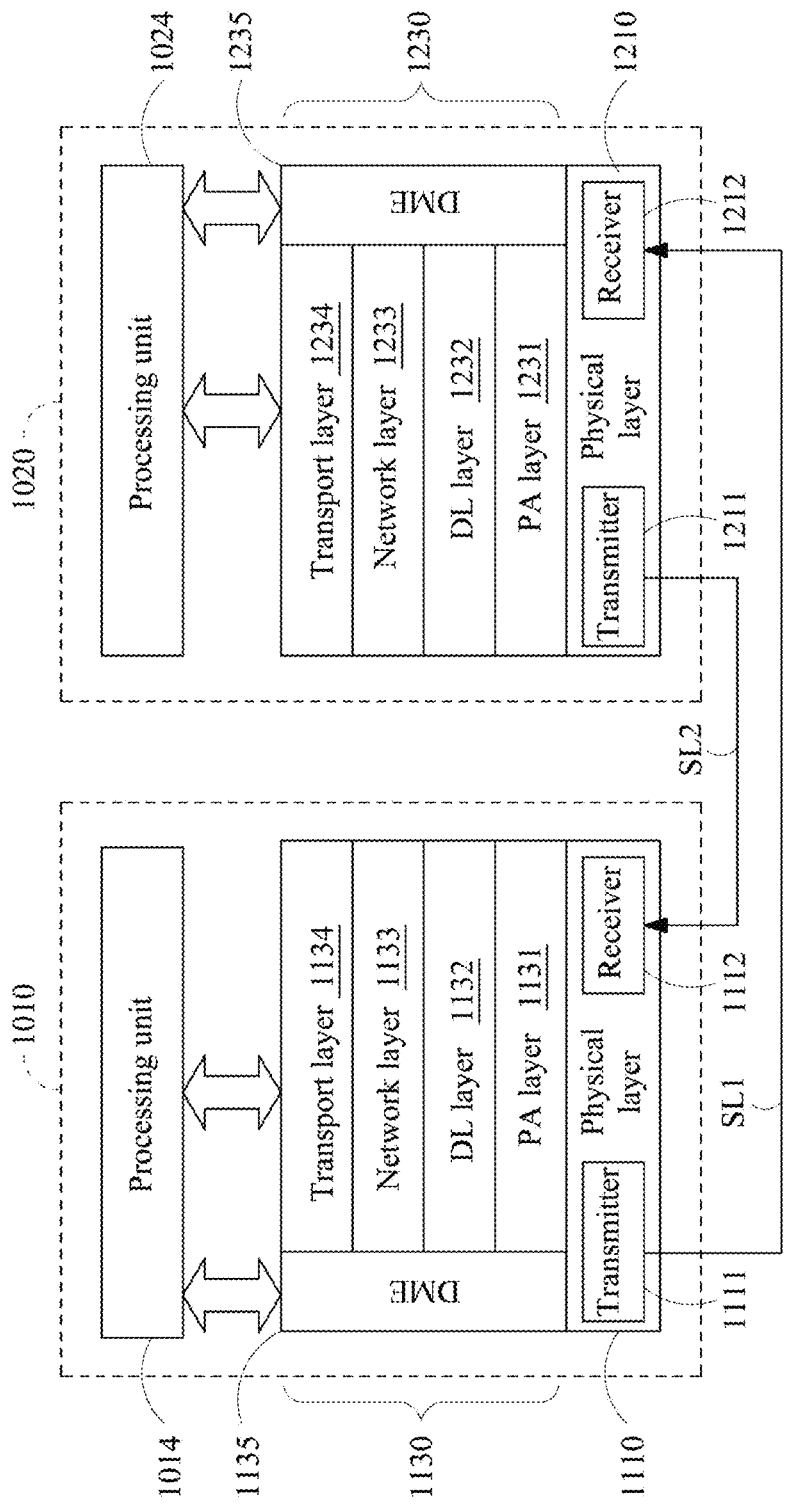
FIG. 12 is a schematic diagram of an embodiment of a layered structure of the storage system in FIG. 11A according to the interconnection protocol.

Referring to FIG. 12, a schematic diagram of layered architecture of the storage system in FIG. 11A is shown according to the UFS standard. Because the UFS standard is based on the MIPI UniPro layer and the MIPI M-PHY layer, the host interface 1011 and the hardware protocol engine 1013 of the host 1010 shown in FIG. 11A are respectively used to implement a modified physical layer 1110 and a modified UniPro layer 1130 in FIG. 12. Also, the device interface 1021 and the hardware protocol engine 1023 of the storage device 1020 in FIG. 11A are respectively used to implement a modified physical layer 1210 and a modified UniPro layer 1230 in FIG. 12.

As shown in FIG. 12, the modified UniPro layer 1130 (or 1230) can include a modified physical adapter (PA) layer 1131 (or 1231), a data link (DL) layer 1132 (or 1232), a network layer 1133 (or 1233), and a transport layer 134 (or 1234). The layers in the modified UniPro layer 1230 of the storage device 1020 can also similarly operate and be implemented.

The modified physical adapter layer (1131 or 1231) couples the modified physical layer (1110 or 1210) to the data link layer (1132 or 1232). The modified physical adapter layer (1131 or 1231) is capable of performing bandwidth control and power management between the modified physical layer (1110 or 1210) and the data link layer (1132 or 1232). In practice, the modified physical layer 1110 of the host 1010 includes a transmitter (TX) 1111 and a receiver (RX) 1112, and the modified physical layer 1210 of the storage device 1020 includes a transmitter (TX) 1211 and a receiver (RX) 1212, thereby establishing data lanes SL1 and SL2 to perform full duplex communication. The modified UniPro specification may support multiple data lanes for a link in each transmission direction (for example, forward or backward).

The data link layer (1132 or 1232) is capable of performing flow control of data transmission between the host 1010 and the storage device 1020. The data link layer is capable of performing error detection and re-transmission of a frame in case of errors, according to one or more of the embodiments above.

The network layer (1133 or 1233) is used to select a routing function for a transmission path for the packets received from the transport layer (1134 or 1234).

The transport layer (1134 or 1234) can use a command received from the UFS application layer to configure a data segment suitable for the protocol and transmit the data segment to the network layer (1133 or 1233), or can extract a command from packets received from the network layer (1133 or 1233) and transmit the command to the UFS application layer.

Moreover, the modified UniPro layer (1130 or 1230) can be further implemented with a device management entity (DME) (1135 or 1235), which can communicate with the layers in the modified physical layer (1110 or 1210) and the modified UniPro layer (1130 or 1230), for example, the modified physical adapter layer (1131 or 1231), the data link layer (132 or 232), the network layer (1133 or 1233), and the transport layer (1134 or 1234), so as to communicate with the UFS application layer, thereby implementing the modified unified protocol (UniPro) overall functions such as control or configuration functions including power-on, power-off, reset, and power mode change.

The circuit architecture in FIG. 10 can be applied to a controller in FIG. 11A, FIG. 11B, FIG. 11C. or FIG. 12 to perform operations according to one or more of the embodiments of FIG. 3, FIG. 4A, FIG. 4B, or one or more related embodiments or examples, whenever appropriate.

In the present disclosure. "asserting" a signal (or other alternative forms such as "asserted" or "assertion") means that a signal is set to be in an active state, which may be an active voltage level in a high or low level, or may be a signal in an associated form. "De-asserting" a signal (or other alternative forms such as "de-asserted" or "de-assertion") means that a signal is set to be in an inactive state, which may be an inactive voltage level in a low or high level, or may be a signal in another associated form. If a signal is set to be at a low level to represent active-low, "asserting" the signal means that the signal is set to a low level, and "de-asserting" the signal means that the signal is set to a high level. If a signal is set to be at a high level to represent active-high, "asserting" a signal means that the signal is set to a high level, and "de-asserting" the signal means that the signal is set to a low level.

Moreover, in the embodiments related to the host and the storage device above, the hardware protocol engine in the host controller or the device controller can be designed based on Hardware Description Language (HDL) such as Verilog or techniques of any other design methods of digital circuits generally known to a person skilled in the art, and can be implemented by one or more of circuits based on such as a field programmable gate array (FPGA), an application-specific integrated circuit (ASIC), or a complex programmable logic device (CPLD), or be implemented by a dedicated circuit or module. The host controller or the device controller (or a processing unit or a hardware protocol engine therein) can also be based on a microcontroller, a processor, or a digital signal processor (DSP).

In the present disclosure, technologies for facilitating data link layer initialization are provided, and are suitable for an electronic device capable of communicating with another electronic device according to the interconnection protocol. In some embodiments, flow control information exchange can be completed robustly and error recovery of data link layer initialization can be speeded up.

The present disclosure is described by using the embodiments above. A person skilled in the art should understand that, these embodiments are merely for describing the present disclosure are not to be construed as limitations to the scope of the present disclosure. It should be noted that all equivalent changes, replacements and substitutions made to the embodiments are to be encompassed within the scope of the present disclosure. Therefore, the scope of protection of the present disclosure should be accorded with the broadest interpretation of the appended claims.

What is claimed is:

1. A method for facilitating data link layer initialization for an electronic device capable of communicating with another electronic device, the method comprising steps of:
   a) during data link layer initialization in the electronic device, transmitting a first acknowledgment and flow control (AFC) frame for a traffic class to the other electronic device, the first AFC frame including a first indicator to notify the other electronic device that the electronic device does not receive any AFC frame for the traffic class from the other electronic device;
   b) during the data link layer initialization in the electronic device, determining that an AFC frame for the traffic class is received from the other electronic device within a first time interval after the first AFC frame is transmitted, the first time interval being less than an expiration value of a protection timer for the traffic class; and
   c) during the data link layer initialization in the electronic device, in response to the AFC frame for the traffic class received from the other electronic device within the first time interval, transmitting a second AFC frame for the traffic class to the other electronic device, the second AFC frame including a second indicator to notify the other electronic device that the electronic device receives an AFC frame for the traffic class from the other electronic device.

2. The method according to claim 1, wherein in the step a), the first AFC frame is transmitted for a number of times in response to not receiving any AFC frame for the traffic class from the other electronic device before the protection timer expires.

3. The method according to claim 1, wherein the method further comprises:
   determining that the AFC frame for the traffic class received from the other electronic device includes a corresponding second indicator to notify the electronic device that the other electronic device receives an AFC frame for the traffic class from the electronic device, wherein the data link layer initialization for the traffic class in the electronic device is completed.

4. The method according to claim 1, wherein the method further comprises:
   determining that the AFC frame for the traffic class received from the other electronic device includes a corresponding first indicator to notify the electronic device that the other electronic device does not receive an AFC frame for the traffic class from the electronic device; and
   in response to that the AFC frame for the traffic class received from the other electronic device includes the corresponding first indicator, re-transmitting the second AFC frame for the traffic class to the other electronic device, the second AFC frame including the second indicator to notify the other electronic device that the electronic device receives an AFC frame for the traffic class from the other electronic device.

5. The method according to claim 4, wherein the method further comprises:
   transmitting a lane alignment pattern before re-transmitting the second AFC frame.

6. The method according to claim 1, wherein the method further comprises:
   determining that the AFC frame for the traffic class received from the other electronic device includes the corresponding first indicator to notify the electronic device that the other electronic device does not receive an AFC frame for the traffic class from the electronic device and determining that number of re-transmitting of the second AFC frame for the traffic class to the other electronic device reaches a retry number threshold; and
   transmitting an error message indicating an error of data link layer initialization for the traffic class to notify an application layer of the electronic device before the protection timer expires.

7. The method according to claim 1, wherein the first AFC frame is based on an AFC frame of a Unified Protocol and the first AFC frame uses at least one reserved bit in the AFC frame of the Unified Protocol as the first indicator to notify the other electronic device that the electronic device does not receive any AFC frame for the traffic class from the other electronic device.

8. The method according to claim 1, wherein the second AFC frame is based on an AFC frame of a Unified Protocol and the second AFC frame uses at least one reserved bit in the AFC frame of the Unified Protocol as the second indicator to notify the other electronic device that the electronic device receives an AFC frame for the traffic class from the other electronic device.

9. The method according to claim 1, wherein the first AFC frame is based on an AFC frame of a Unified Protocol and the first AFC frame uses at least one field for indicating a credit transmit request in the AFC frame of the Unified Protocol as the first indicator to notify the other electronic device that the electronic device does not receive any AFC frame for the traffic class from the other electronic device.

10. The method according to claim 1, wherein the second AFC frame is based on an AFC frame of a Unified Protocol and the second AFC frame uses at least one field for indicating a credit transmit request in the AFC frame of the Unified Protocol as the second indicator to notify the other electronic device that the electronic device receives an AFC frame for the traffic class from the other electronic device.

11. An electronic device configured to communicate with another electronic device, the electronic device comprising:
  a controller including:
    a physical layer circuit for signal transmission; and
    a link controller, coupled to the physical layer circuit,
  wherein the controller is configured to perform a plurality of operations during data link layer initialization of the link controller, the plurality of operations including:
  a) transmitting a first acknowledgment and flow control (AFC) frame for a traffic class to the other electronic device, the first AFC frame including a first indicator to notify the other electronic device that the electronic device does not receive any AFC frame for the traffic class from the other electronic device;
  b) determining that an AFC frame for the traffic class is received from the other electronic device within a first time interval after the first AFC frame is transmitted, the first time interval being less than an expiration value of a protection timer for the traffic class, and
  c) in response to the AFC frame for the traffic class received from the other electronic device within the first time interval, transmitting a second AFC frame for the traffic class to the other electronic device, the second AFC frame including a second indicator to notify the other electronic device that the electronic device receives an AFC frame for the traffic class from the other electronic device.

12. The electronic device according to claim 11, wherein in the operation a), the first AFC frame is transmitted for a number of times in response to not receiving any AFC frame for the traffic class from the other electronic device before the protection timer expires.

13. The electronic device according to claim 11, wherein the plurality of operations further comprises:
  determining that the AFC frame for the traffic class received from the other electronic device includes a corresponding second indicator to notify the electronic device that the other electronic device receives an AFC frame for the traffic class from the electronic device, wherein the data link layer initialization for the traffic class in the electronic device is completed.

14. The electronic device according to claim 11, wherein the plurality of operations further comprises:
  determining that the AFC frame for the traffic class received from the other electronic device includes a corresponding first indicator to notify the electronic device that the other electronic device does not receive an AFC frame for the traffic class from the electronic device; and
  in response to that the AFC frame for the traffic class received from the other electronic device includes the corresponding first indicator, re-transmitting the second AFC frame for the traffic class to the other electronic device, the second AFC frame including the second indicator to notify the other electronic device that the electronic device receives an AFC frame for the traffic class from the other electronic device.

15. The electronic device according to claim 14, wherein the plurality of operations further comprises:
  transmitting a lane alignment pattern before re-transmitting the second AFC frame.

16. The electronic device according to claim 11, wherein the plurality of operations further comprises:
  determining that the AFC frame for the traffic class includes received from the other electronic device includes the corresponding first indicator to notify the electronic device that the other electronic device does not receive an AFC frame for the traffic class from the electronic device and determining that number of re-transmitting of the second AFC frame for the traffic class to the other electronic device reaches a retry number threshold; and
  transmitting an error message indicating an error of data link layer initialization for the traffic class to notify an application layer of the electronic device before the protection timer expires.

17. The electronic device according to claim 1, wherein the first AFC frame is based on an AFC frame of a Unified Protocol and the first AFC frame uses at least one reserved bit in the AFC frame of the Unified Protocol as the first indicator to notify the other electronic device that the electronic device does not receive any AFC frame for the traffic class from the other electronic device.

18. The electronic device according to claim 11, wherein the second AFC frame is based on an AFC frame of a Unified Protocol and the second AFC frame uses at least one reserved bit in the AFC frame of the Unified Protocol as the second indicator to notify the other electronic device that the electronic device receives an AFC frame for the traffic class from the other electronic device.

19. The electronic device according to claim 11, wherein the first AFC frame is based on an AFC frame of a Unified Protocol and the first AFC frame uses at least one field for indicating a credit transmit request in the AFC frame of the Unified Protocol as the first indicator to notify the other electronic device that the electronic device does not receive any AFC frame for the traffic class from the other electronic device.

20. The electronic device according to claim 11, wherein the second AFC frame is based on an AFC frame of a Unified Protocol and the second AFC frame uses at least one field for indicating a credit transmit request in the AFC frame of the Unified Protocol as the second indicator to notify the other electronic device that the electronic device receives an AFC frame for the traffic class from the other electronic device.

* * * * *